(12) United States Patent
Edge

(10) Patent No.: US 11,546,848 B2
(45) Date of Patent: Jan. 3, 2023

(54) SYSTEMS AND METHODS TO ENABLE COMBINED PERIODIC AND TRIGGERED LOCATION OF A MOBILE DEVICE

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/316,475

(22) Filed: May 10, 2021

(65) Prior Publication Data

US 2021/0266833 A1 Aug. 26, 2021

Related U.S. Application Data

(62) Division of application No. 15/707,406, filed on Sep. 18, 2017, now Pat. No. 11,405,863.
(Continued)

(51) Int. Cl.
*H04W 52/02* (2009.01)
*H04W 28/06* (2009.01)
(Continued)

(52) U.S. Cl.
CPC ....... *H04W 52/0216* (2013.01); *H04L 67/125* (2013.01); *H04L 67/51* (2022.05);
(Continued)

(58) Field of Classification Search
CPC . H04W 52/0216; H04W 76/28; H04W 28/06; H04W 72/1263; H04L 67/51; H04L 67/125; H04L 67/52; H04L 67/62
See application file for complete search history.

(56) References Cited

U.S. PATENT DOCUMENTS 6,725,048 B2  4/2004  Mao et al.
6,985,747 B2  1/2006  Chithambaram
(Continued)

FOREIGN PATENT DOCUMENTS

CN   101455096 A   6/2009
CN   101493513 A   7/2009
(Continued)

OTHER PUBLICATIONS

ETSI TS 123 271, "Digital Cellular Telecommunications System (Phase 2+) (GSM); Universal Mobile Telecommunications System (UMTS); LTE; Functional Stage 2 Description of Location Services (LCS) (3GPP TS 23.271 version 14.2.0 Release 14)", ETSI TS 123 271, V14.2.0, pp. 29-31, Jul. 2017, 187 Pages.
(Continued)

*Primary Examiner* — Huy D Vu
*Assistant Examiner* — Bailor C Hsu
(74) *Attorney, Agent, or Firm* — QLCMP266D1US

(57) ABSTRACT

Methods and techniques are described for initiating a periodic and triggered location in a target UE. After an LCS Client requests initiation of periodic and triggered location reporting from the UE, two intermediate responses are returned by a network. A first response indicates that the periodic and triggered location request has been received and accepted by the network. A second response indicates that periodic and triggered location has been activated in the UE. Additionally, a periodic and triggered location request may include a maximum event sampling interval and a maximum reporting interval and one or more location triggers. The maximum event sampling interval can limit UE power consumption and the maximum reporting interval can detect when periodic and triggered location is no longer active in a UE. The location triggers may include periodic
(Continued)

US 11,546,848 B2

Page 2 reporting, reporting using area events or reporting based on UE motion.

29 Claims, 10 Drawing Sheets

Related U.S. Application Data

(60) Provisional application No. 62/454,639, filed on Feb. 3, 2017, provisional application No. 62/446,329, filed on Jan. 13, 2017, provisional application No. 62/418,772, filed on Nov. 7, 2016, provisional application No. 62/404,733, filed on Oct. 5, 2016.

(51) Int. Cl.
| | |
|---|---|
| *H04L 29/08* | (2006.01) |
| *H04W 72/12* | (2009.01) |
| *H04W 76/28* | (2018.01) |
| *H04L 67/125* | (2022.01) |
| *H04L 67/51* | (2022.01) |
| *H04L 67/52* | (2022.01) |
| *H04L 67/62* | (2022.01) |

(52) U.S. Cl.
CPC ....... *H04W 28/06* (2013.01); *H04W 72/1263* (2013.01); *H04W 76/28* (2018.02); *H04L 67/52* (2022.05); *H04L 67/62* (2022.05); *Y02D 30/70* (2020.08)

(56) References Cited

U.S. PATENT DOCUMENTS

| | | | |
|---|---|---|---|
| 7,209,757 | B2 | 4/2007 | Naghian et al. |
| 7,254,388 | B2 | 8/2007 | Nam et al. |
| 7,321,773 | B2 | 1/2008 | Hines et al. |
| 7,509,132 | B2 | 3/2009 | Duan et al. |
| 7,660,590 | B2 | 2/2010 | Timiri et al. |
| 7,764,961 | B2 | 7/2010 | Zhu et al. |
| 7,778,648 | B2 | 8/2010 | Ge et al. |
| 7,860,517 | B1 | 12/2010 | Patoskie et al. |
| 7,974,639 | B2 | 7/2011 | Burroughs et al. |
| 8,154,401 | B1 | 4/2012 | Bertagna et al. |
| 8,165,602 | B2 | 4/2012 | Kim et al. |
| 8,195,195 | B2 | 6/2012 | Kim et al. |
| 8,504,060 | B2 | 8/2013 | Harindranath |
| 8,526,945 | B2 | 9/2013 | Knauft et al. |
| 8,780,732 | B2 | 7/2014 | Song et al. |
| 9,191,520 | B2 | 11/2015 | Titus et al. |
| 9,326,096 | B1 | 4/2016 | Gatmir-Motahari et al. |
| 9,693,338 | B2 | 6/2017 | Zhao et al. |
| 9,781,259 | B1 | 10/2017 | Kodaypak |
| 10,244,420 | B2 | 3/2019 | Yamine et al. |
| 10,341,893 | B2 | 7/2019 | Siomina et al. |
| 10,499,337 | B1 | 12/2019 | Bart |
| 10,715,951 | B1 | 7/2020 | Ratasuk et al. |
| 11,140,649 | B2 | 10/2021 | Ryu et al. |
| 2005/0123149 | A1 | 6/2005 | Elko et al. |
| 2006/0223490 | A1 | 10/2006 | Kim et al. |
| 2006/0293066 | A1 | 12/2006 | Edge et al. |
| 2007/0004429 | A1 | 1/2007 | Edge et al. |
| 2007/0015522 | A1* | 1/2007 | Ruutu .................. H04W 4/029 455/456.3 |
| 2007/0049288 | A1 | 3/2007 | Lamprecht et al. |
| 2007/0054675 | A1 | 3/2007 | Duan |
| 2007/0185985 | A1 | 8/2007 | Shim et al. |
| 2007/0232322 | A1* | 10/2007 | Jagadeesan ............ H04W 8/12 455/456.1 |
| 2008/0174491 | A1* | 7/2008 | Kim ........................ H04W 4/02 342/450 |
| 2009/0049154 | A1 | 2/2009 | Ge |
| 2009/0054035 | A1 | 2/2009 | Kim et al. |
| 2009/0167554 | A1 | 7/2009 | Munje et al. |
| 2009/0181698 | A1 | 7/2009 | Farmer et al. |
| 2010/0041418 | A1 | 2/2010 | Edge et al. |
| 2011/0053606 | A1 | 3/2011 | Yao et al. |
| 2011/0053613 | A1 | 3/2011 | Zhou et al. |
| 2011/0064046 | A1 | 3/2011 | Zhu |
| 2011/0098048 | A1 | 4/2011 | Zhang et al. |
| 2011/0171974 | A1 | 7/2011 | Kim et al. |
| 2011/0176486 | A1* | 7/2011 | Mahdi .................. H04W 12/02 370/328 |
| 2011/0256873 | A1* | 10/2011 | Vikberg ................ H04W 60/04 455/436 |
| 2012/0040681 | A1* | 2/2012 | Yan ........................ H04W 4/23 455/456.2 |
| 2012/0314604 | A1 | 12/2012 | Siomina et al. |
| 2013/0012232 | A1 | 1/2013 | Titus et al. |
| 2013/0193909 | A1 | 8/2013 | Blevins |
| 2013/0303164 | A1 | 11/2013 | Seo |
| 2013/0310068 | A1 | 11/2013 | Fischer et al. |
| 2013/0324123 | A1 | 12/2013 | Ianev et al. |
| 2014/0098690 | A1 | 4/2014 | Siomina et al. |
| 2014/0155101 | A1* | 6/2014 | Wachter ................ H04W 4/029 455/456.3 |
| 2014/0244834 | A1 | 8/2014 | Guedalia et al. |
| 2014/0248901 | A1 | 9/2014 | Johnsson et al. |
| 2015/0011239 | A1 | 1/2015 | Quan et al. |
| 2015/0065160 | A1 | 3/2015 | Meredith et al. |
| 2015/0189502 | A1 | 7/2015 | Meredith et al. |
| 2015/0201318 | A1 | 7/2015 | Singh et al. |
| 2015/0229713 | A1 | 8/2015 | Lu et al. |
| 2015/0230057 | A1 | 8/2015 | Jiang et al. |
| 2015/0289127 | A1 | 10/2015 | Ou et al. |
| 2015/0296379 | A1 | 10/2015 | Nix |
| 2015/0304982 | A1 | 10/2015 | Liao |
| 2015/0327032 | A1 | 11/2015 | Hedman et al. |
| 2016/0100362 | A1 | 4/2016 | Palanisamy et al. |
| 2016/0156513 | A1 | 6/2016 | Zhang et al. |
| 2016/0157056 | A1 | 6/2016 | Kim et al. |
| 2016/0205625 | A1 | 7/2016 | Stojanovski et al. |
| 2016/0227381 | A1 | 8/2016 | Bargetzi et al. |
| 2017/0150395 | A1 | 5/2017 | Karlsson et al. |
| 2018/0041984 | A1* | 2/2018 | Li ........................ H04W 64/00 |
| 2018/0054795 | A1 | 2/2018 | Edge |
| 2018/0054796 | A1 | 2/2018 | Edge |
| 2018/0098279 | A1 | 4/2018 | Edge |
| 2018/0249528 | A1 | 8/2018 | Kuge et al. |
| 2019/0182794 | A1 | 6/2019 | Wong et al. |
| 2020/0154506 | A1 | 5/2020 | Liu |
| 2020/0229130 | A1 | 7/2020 | Keating et al. |
| 2020/0252902 | A1 | 8/2020 | Edge |
| 2022/0103976 | A1 | 3/2022 | Gummadi et al. |

FOREIGN PATENT DOCUMENTS

| | | |
|---|---|---|
| CN | 101965033 A | 2/2011 |
| CN | 102111847 A | 6/2011 |
| CN | 102131217 A | 7/2011 |
| CN | 102340762 A | 2/2012 |
| CN | 102368875 A | 3/2012 |
| CN | 102413485 A | 4/2012 |
| CN | 102483458 A | 5/2012 |
| CN | 102860063 A | 1/2013 |
| CN | 103188751 A | 7/2013 |
| CN | 103354986 A | 10/2013 |
| CN | 103517093 A | 1/2014 |
| CN | 103546984 A | 1/2014 |
| CN | 103581398 A | 2/2014 |
| CN | 103686792 A | 3/2014 |
| CN | 103858512 A | 6/2014 |
| CN | 104978535 A | 10/2015 |
| EP | 2474838 A1 | 7/2012 |
| EP | 2606691 B1 | 12/2014 |
| EP | 3018945 A1 | 5/2016 |
| EP | 3497991 | 6/2019 |
| JP | 2001128226 A | 5/2001 |
| JP | 2018507596 A | 3/2018 |
| WO | WO-2005117295 A1 | 12/2005 |
| WO | WO-2009024002 A1 | 2/2009 |
| WO | WO-2011130082 A1 | 10/2011 |

(56) References Cited

FOREIGN PATENT DOCUMENTS

| WO | WO-2012047070 A3 | 6/2012 |
|---|---|---|
| WO | WO-2012152155 A1 | 11/2012 |
| WO | WO-2013062462 A1 | 5/2013 |
| WO | WO-2013111906 A1 | 8/2013 |
| WO | WO-2014134406 A1 | 9/2014 |
| WO | WO-2014146530 A1 | 9/2014 |
| WO | WO-2014194300 A1 | 12/2014 |
| WO | WO-2016126847 A1 | 8/2016 |
| WO | WO-2017058287 A1 | 4/2017 |
| WO | WO-2018038798 A1 | 3/2018 |

OTHER PUBLICATIONS

ETSI TS 123 271, "Digital Cellular Telecommunications System (Phase 2+); Universal Mobile Telecommunications System (UMTS); LTE; Functional Stage 2 Description of Location Services (LCS) (3GPP TS 23.271 version 10.4.0 Release 10)", ETSI TS 123 271, V10.4.0, pp. 27-29, Apr. 2013, 171 Pages.
ETSI TS 123 401, "LTE; General Packet Radio Service (GPRS) Enhancements for Evolved Universal Terrestrial Radio Access Network (E-UTRAN) Access (3GPP TS 23.401 version 12.6.0 Release 12)", ETSI TS 123 401, V12.6.0, pp. 135-138, Sep. 2014, 308 Pages.
Qualcomm Incorporated: "Triggered Location Information Transfer due to Cell Change", Change Request 36.355 CR 0016 rev; v.9.0.0, R2-101788, 3GPP TSG RAN WG2 Meeting #69, Feb. 22-26, 2010, San Francisco, California, USA, pp. 1-4.
3GPP TS 29.171, "3rd Generation Partnership Project; Technical Specification Group Core Network and Terminals; Location Services (LCS); LCS Application Protocol (LCS-AP) between the Mobile Management Entity (MME) and Evolved Serving Mobile Location Centre (E-SMLC); SLs interface (Release 13)", 3GPP TS 29.171 V13.0.0, 3rd Generation Partnership Project (3GPP), Mobile Competence Centre, 650, Route Des Lucioles, F-06921, Sophia-Antipolis Cedex, France, vol. CT WG4, No. V13.0 .0, Sep. 17, 2015, 51 pages.
"3rd Generation Partnership Project; Technical Specification Group Services and System Aspects; Functional stage 2 Description of Location Services (LCS) (Release 12)", 3GPP TS 23.271 V12.1.0 (Jun. 2014), pp. 1-169.
3rd Generation Partnership Project; Technical Specification Group Services and System Aspects; Functional stage 2 description of Location Services (LCS) (Release 13), 3GPP TS 23.271, 3rd Generation Partnership Project (3GPP), Mobile Competence Centre, 650, Route Des Lucioles, F-06921, Sophia-Antipolis Cedex, France, vol. SA WG2, No. V13.0.0, Sep. 15, 2015, XP050995999, pp. 1-172.
European Search Report—EP20173887—Search Authority—The Hague—dated Oct. 9, 2020.
International Preliminary Report on Patentability—PCT/US2017/039254, The International Bureau of WIPO—Geneva, Switzerland, dated Mar. 7, 2019.
International Preliminary Report on Patentability—PCT/US2017/039256, The International Bureau of WIPO—Geneva, Switzerland, dated Mar. 7, 2019.
International Preliminary Report on Patentability—PCT/US2017/056213, The International Bureau of WIPO—Geneva, Switzerland, dated May 16, 2019.
International Search Report and Written Opinion—PCT/US2017/039254—ISA/EPO—dated Dec. 7, 2017.
International Search Report and Written Opinion—PCT/US2017/039256—ISA/EPO—dated Dec. 14, 2017.
International Search Report and Written Opinion—PCT/US2017/056213—ISA/EPO—dated Apr. 10, 2018.

Partial International Search Report—PCT/US2017/056213—ISA/EPO—dated Jan. 30, 2018.
Partial International Search Report—PCT/US2017/039254—ISA/EPO—dated Sep. 14, 2017.
Partial International Search Report—PCT/US2017/039256—ISA/EPO—dated Sep. 19, 2017.
Qualcomm Incorporated : "Addition of Impacts and Evaluations for Location Services Solutions", SA WG2 Meeting #117bis, 3GPP Draft; S2-166200 WAS6013 WAS5976 WAS5728 CIOT EX Evaluation of Location Enhancements for CIOT V3, 3rd Generation Partnership Project (3GPP), Mobile Competence Centre, 650, Route Des Lucioles, F-06921, Sophia-Antipolis Cedex, France, vol. SA WG2, No. Kaohsiung City, Taiwan; Oct. 24, 2016, 13 pages, Oct. 19, 2016-Oct. 23, 2016, XP051170138, Retrieved from the Internet: URL: http://www.3gpp.org/ftp/tsg_sa/WG2_Arch/TSGS2_117_Kaohsiung_City/Docs/[retrieved on Oct. 24, 2016].
Qualcomm Incorporated: "Addition of Periodic and Triggered Location for EPC Access", 3GPP DRAFT; S2-166688 (CR 23.271—Periodic and Triggered EPC-MT-LR), 3rd Generation Partnership Project (3GPP), Mobile Competence Centre, 650, Route Des Lucioles, F-06921, Sophia-Antipolis Cedex, France, vol. SA WG2, No. Reno, Nevada, USA; Nov. 8, 2016, XP051199657, Retrieved from the Internet: URL :http://www.3gpp.org/ftp/tsg_sa/WG2_Arch/TSGS2_118_Reno/Docs/ [retrieved on Nov. 8, 2016], 20 pages.
Qualcomm Incorporated: "Key Issues and Solutions for Location Support for CIoT Devices—1", SA WG2 Meeting #116bis, 3GPP Draft; S2-164846 WAS4489, 3rd Generation Partnership Project (3GPP), Mobile Competence Centre, 650, Route Des Lucioles, F-06921, Sophia-Antipolis Cedex, France, vol. SA WG2, No. Sanya, P.R. China; Sep. 3, 2016, 7 pages, Aug. 29, 2016-Sep. 2, 2016, XP051168915, Retrieved from the Internet: URL: http://www.3gpp.org/ftp/tsg_sa/WG2_Arch/TSGS2_116BIS_Sanya/Docs/ [retrieved on Sep. 3, 2016].
Qualcomm Incorporated: "Location Support for CIoT Devices", SA WG2 Meeting #116bis, 3GPP Draft; S2-164488, 3rd Generation Partnership Project (3GPP), Mobile Competence Centre, 650, Route Des Lucioles, F-06921, Sophia-Antipolis Cedex, France, vol. SA WG2, No. Sanya, P.R. China; Aug. 27, 2016, 8 pages, Aug. 29, 2016-Sep. 2, 2016, XP051130475, Retrieved from the Internet: URL: http://www.3gpp.org/ftp/Meetings_3GPP_SYNC/SA2/Docs/ [retrieved on Aug. 27, 2016].
Taiwan Search Report—TW106121547—TIPO—dated Oct. 18, 2020.
Taiwan Search Report—TW106121547—TIPO—dated Feb. 22, 2021.
TSG CT WG1: "CRs to Rel-7 WI "EGGS" for TSs 43.068 and 43.069", 3GPP TSG CT Meeting #28, CP-050073, (May 24, 2005), Jun. 1-3, 2005, Quebec, Canada, 1 Page.
Woqi M., "NB-IoT Opens up New Opportunities in Development of the Internet of Things Industry", Computer Knowledge and Technology, Jul. 20, 2016, 3 pages.
Li Ping S., "Analysis of LTE Technology-Based Internet of Things Technology", Silicon Valley Issue 8, Apr. 23, 2013, 3 Pages.
Muyin L., et al., "Research on Internet of Things Congestion Control Solutions Based on Mobile Communication Network", China Internet Issue 9, Sep. 15, 2013, 13 Pages.
3rd Generation Partnership Project; Technical Specification Group Services and System Aspects; Study on Extended Architecture Support for Cellular Internet of Things (Release 14), 3GPP TR 23.730 V0.1.0 (Jul. 2016), Aug. 17, 2016, 27 Pages.
3rd Generation Partnership Project; Technical Specification Group Services and System Aspects; Study on Extended Architecture Support for Cellular Internet of Things (Release 14), 3GPP TR 23.730 V0.2.0 (Sep. 2016), Sep. 16, 2016, 55 Pages.

* cited by examiner

SYSTEMS AND METHODS TO ENABLE COMBINED PERIODIC AND TRIGGERED LOCATION OF A MOBILE DEVICE

CLAIM OF PRIORITY UNDER 35 U.S.C. § 119

This application is a divisional of U.S. application Ser. No. 15/707,406, filed Sep. 18, 2017, and entitled "SYSTEMS AND METHODS TO ENABLE COMBINED PERIODIC AND TRIGGERED LOCATION OF A MOBILE DEVICE," which claims under 35 USC § 119 the benefit of and priority to U.S. Provisional Application No. 62/404,733, filed Oct. 5, 2016, and entitled "LOCATION SUPPORT FOR CIoT AND NB-IoT DEVICES," U.S. Provisional Application No. 62/418,772, filed Nov. 7, 2016, and entitled "COMBINED PERIODIC AND TRIGGERED LOCATION OF A MOBILE DEVICE," U.S. Provisional Application No. 62/454,639, filed Feb. 3, 2017, and entitled "COMBINED PERIODIC AND TRIGGERED LOCATION OF A MOBILE DEVICE," and U.S. Provisional Application No. 62/446,329, filed Jan. 13, 2017, and entitled "CONTROL PLANE LOCATION SOLUTION FOR 5G NEXTGEN CORE," all of which are assigned to the assignee hereof and are incorporated herein by reference in their entireties.

BACKGROUND

Background Field

The present disclosure relates generally to communication, and more specifically to techniques for supporting location services for user equipments (UEs) in association with a wireless network.

Relevant Background

UEs that form part of the Internet of Things (IoT) will typically only connect to a wireless network for short intervals (e.g. to provide some sporadic service). For example, UEs that are part of the IoT may include features such as extended Discontinuous Reception (eDRX) or Power Saving Mode (PSM). With eDRX or PSM, a UE may remain in idle state and neither be reachable from a serving wireless network nor connect to the serving wireless network for a long period of time (e.g. several hours or longer). During the period of time in which the UE remains in idle state, the UE may not be reachable by a client device (e.g. a Location Services (LCS) client), thereby restricting or blocking location services. This may prevent or impede real time location services such as geofencing, asset tracking and child or pet location because it may not be possible to access a UE or measure signals from a UE to enable a location of the UE to be obtained while the UE is in an idle state. Methods to overcome these limitations may therefore be desirable.

SUMMARY

Methods and techniques are described for initiating a periodic and triggered location service in a target user equipment (UE). After a Location Services (LCS) Client requests initiation of periodic and triggered location reporting from the UE, two intermediate responses are returned. A first response from a network entity is provided indicating that the periodic and triggered location service request has been received and accepted by the network entity. A second response is provided by the UE indicating that periodic and triggered location request has been activated in the UE. The second response may be returned soon after the first response or may be returned several hours or days after the first response if the UE is part of the Internet of Things (IoT) and is connected to the wireless network for short intervals. Additionally, a triggered location service request may include a maximum reporting interval and one or more location triggers. If no location report is provided after the maximum reporting interval, it may be assumed that location reporting was terminated in the UE.

In one implementation, a method at a first network entity of performing periodic and triggered location for a target user equipment includes receiving from a second network entity a periodic and triggered location request for the target user equipment, transmitting a first response to the second network entity indicating that the periodic and triggered location request has been received and accepted, waiting for the target user equipment to be in a reachable state with a wireless network if the target user equipment is not currently in a reachable state, establishing a signaling connection with the target user equipment, transmitting the periodic and triggered location request to the target user equipment, receiving from the target user equipment a confirmation indicating that the periodic and triggered location request has been accepted; and transmitting a second response to the second network entity indicating that the periodic and triggered location request has been activated in the target user equipment.

In one implementation, a first network entity for performing periodic and triggered location for a target user equipment includes an external interface configured to communicate with a second network entity and the target user equipment; and at least one processor configured to receive with the external interface a periodic and triggered location request from the second network entity for the target user equipment, transmit with the external interface a first response to the second network entity indicating that the periodic and triggered location request has been received and accepted, wait for the target user equipment to be in a reachable state with a wireless network if the target user equipment is not currently in a reachable state, establish through the external interface a signaling connection with the target user equipment, transmit with the external interface the periodic and triggered location request to the target user equipment, receive with the external interface an acknowledgment from the target user equipment that the periodic and triggered location request has been received, and transmit a second response to the second network entity indicating that the periodic and triggered location request has been activated in the target user equipment.

In one implementation, a first network entity for performing periodic and triggered location for a target user equipment includes means for receiving from a second network entity a periodic and triggered location request for the target user equipment, means for transmitting a first response to the second network entity indicating that the periodic and triggered location request has been received and accepted, means for waiting for the target user equipment to be in a reachable state with a wireless network if the target user equipment is not currently in a reachable state, means for establishing a signaling connection with the target user equipment, means for transmitting the periodic and triggered location request to the target user equipment, means for receiving from the target user equipment a confirmation indicating that the periodic and triggered location request has been accepted, and means for transmitting a second response to the second network entity indicating that the periodic and triggered location request has been activated in the target user equipment.

In one implementation, a method at a user equipment for performing periodic and triggered location includes receiving a periodic and triggered location request from a first network entity, the periodic and triggered location request comprising a type of location reporting event and at least one of a maximum reporting interval, a minimum reporting interval and a maximum event sampling interval, returning a response to the first network entity indicating that the periodic and triggered location request is accepted, monitoring a location reporting event to determine if the location reporting event occurs, and transmitting a location report to a second network entity when the location reporting event occurs or when no location reporting event occurs during the maximum reporting interval.

In one implementation, a user equipment for performing periodic and triggered location includes a wireless transceiver configured to wirelessly communicate with a first network entity, and at least one processor configured to receive with the wireless transceiver a periodic and triggered location request from the first network entity, the periodic and triggered location request comprising a type of location reporting event and at least one of a maximum reporting interval, a minimum reporting interval and a maximum event sampling interval, returning with the wireless transceiver a response to the first network entity indicating that the periodic and triggered location request is accepted, monitor a location reporting event to determine if the location reporting event occurs, and transmit with the wireless transceiver a location report to a second network entity when the location reporting event occurs or when no location reporting event occurs during the maximum reporting interval.

In one implementation, a user equipment for performing periodic and triggered location includes means for receiving a periodic and triggered location request from a first network entity, the periodic and triggered location request comprising a type of location reporting event and at least one of a maximum reporting interval, a minimum reporting interval and a maximum event sampling interval, means for returning a response to the first network entity indicating that the periodic and triggered location request is accepted, means for monitoring a location reporting event to determine if the location reporting event occurs, and means for transmitting a location report to a second network entity when the location reporting event occurs or when no location reporting event occurs during the maximum reporting interval.

In one implementation, a method at a first network entity of performing periodic and triggered location for a target user equipment includes receiving a periodic and triggered location request for the target user equipment from a second entity, transmitting the periodic and triggered location request for the target user equipment to a third entity, receiving a first response from the third entity indicating that the periodic and triggered location request has been received and accepted by a serving network entity for the target user equipment, transmitting the first response to the second entity, receiving a second response from the third entity indicating that the periodic and triggered location request has been activated in the target user equipment, and transmitting the second response to the second entity.

In one implementation, a first network entity for performing periodic and triggered location for a target user equipment includes an external interface configured to wirelessly communicate with a first network entity and a second network entity, and at least one processor configured to receive with the external interface a periodic and triggered location request for the target user equipment from the second entity, transmit with the external interface the periodic and triggered location request for the target user equipment to the third entity, receive with the external interface a first response from the third entity indicating that the periodic and triggered location request has been received and accepted by a serving network entity for the target user equipment, transmit with the external interface the first response to the second entity, receive with the external interface a second response from the third entity indicating that the periodic and triggered location request has been activated in the target user equipment, and transmit with the external interface the second response to the second entity.

In one implementation, a first network entity for performing periodic and triggered location for a target user equipment includes means for receiving a periodic and triggered location request for the target user equipment from a second entity, means for transmitting the periodic and triggered location request for the target user equipment to a third entity, means for receiving a first response from the third entity indicating that the periodic and triggered location request has been received and accepted by a serving network entity for the target user equipment, means for transmitting the first response to the second entity, means for receiving a second response from the third entity indicating that the periodic and triggered location request has been activated in the target user equipment, and means for transmitting the second response to the second entity.

BRIEF DESCRIPTION OF THE DRAWINGS

An understanding of the nature and advantages of various embodiments may be realized by reference to the following figures.

Elements in different figures with like numbers (with the exception of the numbered stages in FIGS. 2-4) may correspond to one another.

DETAILED DESCRIPTION

Figure 1:
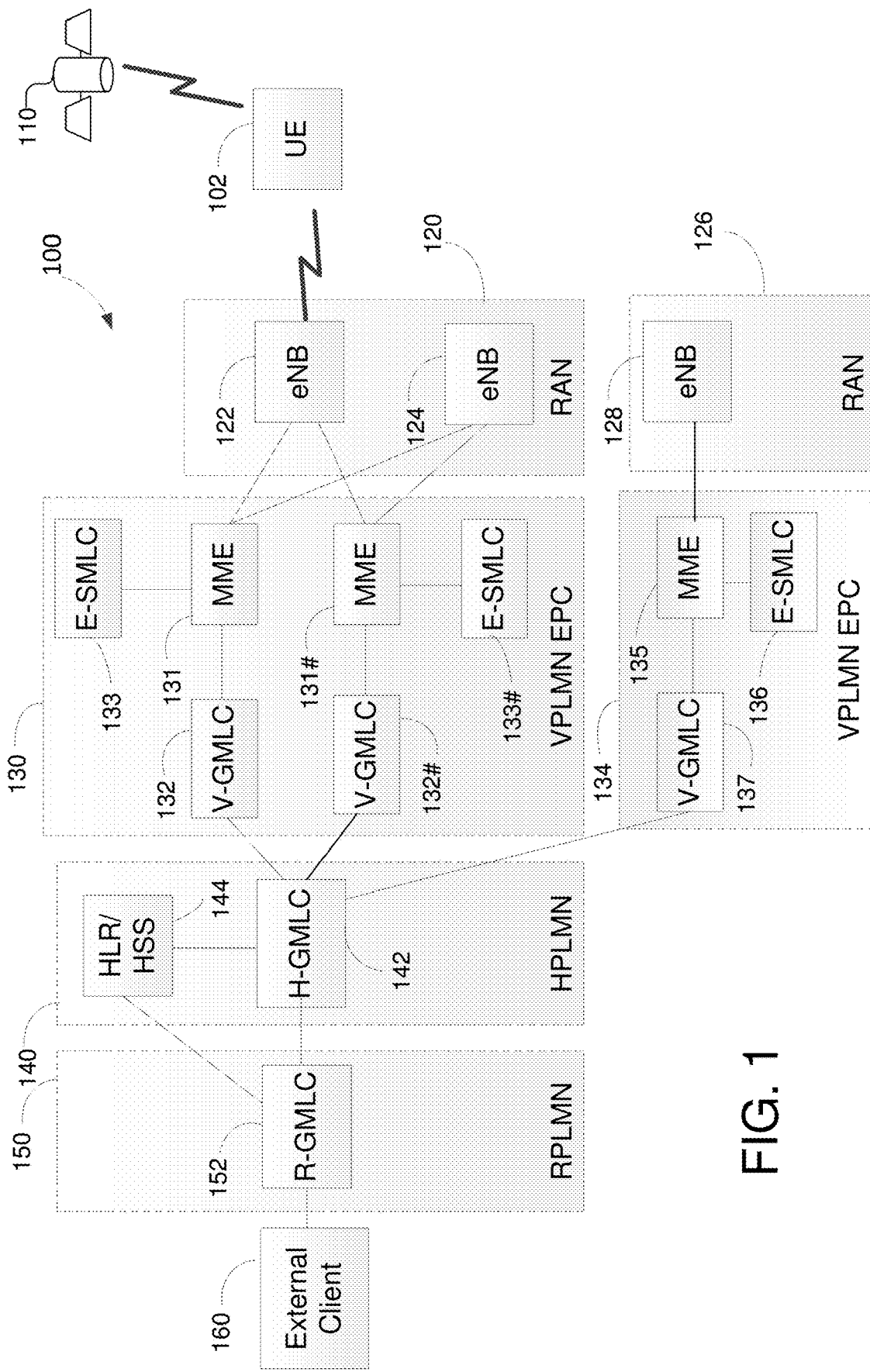
FIG. 1 is a simplified block diagram illustrating the architecture of a system for enabling support of location for mobile devices, according to an embodiment.

UEs that form part of the Internet of Things (IoT) will typically only connect to a wireless network for short intervals (e.g. to provide some sporadic service such as reporting a status or condition of an associated entity, object or person). For example, UEs that are part of the IoT may include features such as extended Discontinuous Reception (eDRX) or Power Saving Mode (PSM). With eDRX or PSM, a UE may remain in idle state and neither be reachable from a serving wireless network nor connect to the serving wireless network for a long period of time (e.g. several hours or longer). During the period of time in which the UE remains in idle state, the UE may not be reachable by a client device (e.g. a Location Services (LCS) client), thereby restricting or blocking location services. This may prevent or impede real time location services such as geofencing, asset tracking and child or pet location because it may not be possible to access a UE or measure signals from a UE to enable a location of the UE to be obtained while the UE is in an idle state. One possible solution to this would be to allow periodic and triggered location reporting to be activated in IoT UEs during periods when real time location access is needed. However, existing procedures for periodic and triggered location have been defined (e.g. by 3GPP) only for UEs that are normally reachable at any time and not for UEs that are typically unreachable. For example, initiating periodic and triggered location in a UE that will not be reachable for several hours or days may not be possible with current procedures.

A new procedure to support different types of periodic and triggered location is described herein. The new procedure may be usable for both UEs that are normally reachable at any time and for IoT UEs that are unreachable for long periods, e.g., due to features such as extended Discontinuous Reception (eDRX) or Power Saving Mode (PSM). The procedure may include a first feature comprising returning two intermediate responses by the network to an LCS client after the LCS client initiates a request for periodic and triggered location reporting for a target UE. The first response may indicate that the LCS client request has been accepted by the network and the network is ready to initiate the procedure in the target UE. Unlike conventional procedures, a second response may be provided indicating that the periodic and triggered location request has been activated in the UE, i.e., the target UE will begin to return periodic and triggered location reports. The second response may be returned soon after the first response, e.g., for a normal UE, or may be returned several hours or days after the first response, e.g., for an IoT UE.

The new procedure may additionally include a second feature comprising a maximum reporting interval for a periodic and triggered location request in which trigger events are reported rather than periodic events, in order to force a UE to issue a location report even when no normal reporting event has occurred. The receipt of a location report may confirm to the network and LCS client that location reporting is still active in the UE. On the other hand, if no location report is received following a maximum reporting interval, an LCS client or network may assume that location reporting was terminated in the UE, and may then terminate and/or explicitly cancel the request. This may avoid a conventional query procedure requiring the LCS client or network entity to periodically query the UE in order to determine if ongoing location sessions are still active. In some aspects of the second feature, a minimum reporting interval may also be included to avoid an excessive number of location reports from a UE. For example, setting a minimum reporting interval equal to some short period (e.g. 10 to 15 minutes) may avoid a large number of reports from a UE over a short period (e.g. one hour) when trigger events are occurring frequently.

The new procedure may further include a third feature comprising a maximum event sampling interval which may define the maximum interval of time between two consecutive sampling actions of a UE in which the UE determines whether a requested location trigger event has or has not occurred, such as the UE having moved by more than a threshold distance or having entered or left a designated target area. A UE may employ a sampling interval less than the maximum event sampling interval if this is possible without much extra power consumption. Increasing the maximum event sampling interval may reduce UE power and battery consumption by potentially reducing the frequency of UE sampling actions but may also increase the delay in reporting a trigger event that has occurred. Therefore, the maximum event sampling interval may be adjusted by an LCS client to achieve an optimum tradeoff between power and battery consumption versus delay in reporting a trigger event that best matches a required location service and capabilities of a target UE. A maximum event sampling interval may contrast with, and may provide more flexibility than, a minimum event sampling interval in which a UE is required to verify whether a trigger event has or has not occurred at some minimal interval of time. For example, a minimum event sampling interval may prevent use of a shorter sampling interval by a UE when the UE can support this without significant extra power consumption. As an example, a UE that is part of or attached to a vehicle or possesses its own charging source (e.g. powered by light, heat or movement of a user) may be less restricted regarding power consumption.

FIG. 1 is a diagram illustrating a system architecture 100 for location support of a user equipment (UE) 102. By way of example, the system architecture 100 may support wireless communications involving Machine Type Communications (MTC), Internet of Things (IoT), Cellular IoT (CIoT) and Narrow Band IoT (NB-IoT), as defined in specifications from the $3^{rd}$ Generation Partnership Project (3GPP). NB-IoT is a Radio Access Type (RAT), supported by the evolved Universal Mobile Telecommunications Service (UMTS) Terrestrial Radio Access Network (E-UTRAN), which was added by 3GPP in specifications for 3GPP Release 13 to provide 200 KHz UL/DL (Uplink/Downlink) carrier bandwidth (and 180 KHz of usable UL/DL bandwidth). The CIoT concerns EPC (evolved packet core) support for NB-IoT, IoT and MTC and is complimentary to NB-IoT (i.e., NB-IoT is principally concerned with E-UTRAN and CIoT is principally concerned with the EPC). The system architecture 100 may support NB-IoT radio access, category M1 (1.4 MHz) LTE radio access for MTC or wide bandwidth Long Term Evolution (LTE) radio access with CIoT operation, or may support wireless communications involving other types of user equipment.

The system architecture 100 may be referred to as an Evolved Packet System (EPS) 100. As illustrated, the system architecture 100 may include the UE 102, a Radio Access Network (RAN) 120, which may be an Evolved UMTS Terrestrial Radio Access Network (E-UTRAN), and an Evolved Packet Core (EPC) 130. The Radio Access Network (RAN) 120 and the EPC 130 may be part of a Visited Public Land Mobile Network (VPLMN) that communicates with a Home Public Land Mobile Network (HPLMN) 140 for the UE 102. The system architecture 100 may interconnect with other access networks. For example, the Internet may be used to carry messages to and from different networks such as the HPLMN 140 and the VPLMN EPC 130. For simplicity those entities/interfaces are not shown. As shown, the system architecture 100 provides packet-switched services, however, as those skilled in the art will readily appreciate, the various concepts presented throughout this disclosure may be extended to networks providing circuit-switched services.

The UE 102 may be any electronic device, which may be configured for NB-IoT, category M1 or (wideband) LTE radio access or other types of radio access if desired. The UE 102 may be referred to as a device, a wireless device, a mobile terminal, a terminal, a mobile station (MS), a mobile device, a Secure User Plane Location (SUPL) Enabled Terminal (SET) or by some other name and may correspond to (or be part of) a smart watch, digital glasses, fitness monitor, smart car, smart appliance, cellphone, smartphone, laptop, tablet, PDA, tracking device, control device, or some other portable or moveable device. A UE 102 may comprise a single entity or may comprise multiple entities such as in a personal area network where a user may employ audio, video and/or data I/O devices and/or body sensors and a separate wireline or wireless modem. Typically, though not necessarily, a UE 102 may support wireless communication such as using Global System for Mobile communications (GSM), Code Division Multiple Access (CDMA), Wideband CDMA (WCDMA), LTE, New Radio (NR) also referred to as Fifth Generation (5G), High Rate Packet Data (HRPD), IEEE 802.11 WiFi, Bluetooth® (BT), WiMax, etc. A UE 102 may also support wireless communication using a wireless LAN (WLAN), Digital Subscriber Line (DSL) or packet cable for example. Although FIG. 1 shows only one UE 102, there may be many other UEs that can each correspond to UE 102.

The UE 102 may enter a connected state with a wireless communication network that may include the Radio Access Network (RAN) 120. In one example, UE 102 may communicate with a cellular communication network by transmitting wireless signals to, or receiving wireless signals from a cellular transceiver, such as an evolved Node B (eNodeB also referred to as an eNB) 122 in the RAN 120. The RAN 120 may include one or more additional eNBs 124. As illustrated, additional RANs, such as a RAN 126, may be in the system architecture 100, which may include one or more eNBs 128. The eNB 122 provides user and control planes protocol terminations toward the UE 102. The eNB 122 may also be referred to as a base station, a base transceiver station, a radio base station, a radio transceiver, a radio network controller, a transceiver function, a base station subsystem (BSS), an extended service set (ESS), or by some other suitable terminology. The UE 102 also may transmit wireless signals to, or receive wireless signals from a local transceiver, such as an access points (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth network) or a cellular network (e.g. an LTE network or other wireless wide area network such as those discussed in the next paragraph). Of course it should be understood that these are merely examples of networks that may communicate with a mobile device over a wireless link, and claimed subject matter is not limited in this respect.

Examples of network technologies that may support wireless communication include NB-IoT, but may further include GSM, CDMA, WCDMA, LTE, HRPD and NR. NB-IoT, CIoT, GSM, WCDMA, LTE and NR are technologies defined by (or being defined by) 3GPP. CDMA and HRPD are technologies defined by the 3rd Generation Partnership Project 2 (3GPP2). WCDMA is also part of the Universal Mobile Telecommunications System (UMTS) and may be supported by an HNB. Cellular transceivers, such as eNBs 122, 124 and 128, may comprise deployments of equipment providing subscriber access to a wireless telecommunication network for a service (e.g., under a service contract). Here, a cellular transceiver may perform functions of a cellular base station in servicing subscriber devices within a cell determined based, at least in part, on a range at which the cellular transceiver is capable of providing access service.

The eNBs 122, 124 are connected by an interface (e.g. a wireless or wireline backhaul connection) to the VPLMN EPC 130. As illustrated, the EPC 130 includes a Mobility Management Entity (MME) 131 through which UE 102 signaling messages are transferred. MME 131 may be the serving MME for UE 102. The MME 131 is the control node that processes the signaling between the UE 102 and the EPC 130 and supports attachment and network connection of UE 102 as well as managing the establishment and release of data, signaling and voice bearers on behalf of the UE 102. The MME 131 may also support user plane (UP) data transfer to and from the UE 102 using a 3GPP Cellular IoT (CIoT) feature known as CIoT Control Plane (CP) optimization in which data packets are transferred to and from the UE via the MME 131, rather than by bypassing the MME 131, in order to avoid the overhead of establishing and releasing data bearers for the UE 102. Generally, the MME 131 provides bearer and connection management for the UE 102 and may be connected to the eNBs 122 and 124, an Enhanced Serving Mobile Location Center (E-SMLC) 133 and a Visited Gateway Mobile Location Center (V-GMLC) 132 in the VPLMN EPC 130. As illustrated, EPC 130 may include one or more additional MMEs, such as MME 131#, that is connected to the eNBs 122 and 124, another E-SMLC 133# and another V-GMLC 132#. In some implementations, the E-SMLC 133# may be the same entity as E-SMLC 133, and/or the V-GMLC 132# may be the same entity as V-GMLC 132. Additionally, as illustrated, the system architecture 100 may include additional VPLMN EPCs (corresponding to different PLMNs), such as EPC 134, which may include one or more additional MMEs, such as MME 135, that is illustrated as being connected to the eNB 128, another E-SMLC 136 and another V-GMLC 137.

The E-SMLCs 133, 133# and 136 may each be configured to support location of the UE 102 using the 3GPP control plane (CP) location solution defined in 3GPP technical specifications (TSs) 23.271 and 36.305. The V-GMLCs 132, 132# and 137, which may each also be referred to simply as a Gateway Mobile Location Center (GMLC) 132, 132# or 137, may be configured to provide access on behalf of an external client (e.g. external client 160) or another network (e.g. HPLMN 140) to the location of UE 102. An external client may also be referred to as an LCS client.

As illustrated, the HPLMN 140 includes a Home Gateway Mobile Location Center (H-GMLC) 142 that may be connected to the V-GMLCs 132, 132# and 137 (e.g. via the Internet). The H-GMLC 142 may be connected to a Home Location Register or Home Subscriber Server (HLR/HSS) 144, which is a central database that contains user-related and subscription-related information for UE 102. The H-GMLC 142 may provide location access to the UE 102 for external clients such as external client 160. The H-GMLC 142 may be connected to the external client 160, e.g., through another network such as the Internet (not shown in FIG. 1). In some cases, a Requesting GMLC (R-GMLC) 152 located in a Requesting PLMN (RPLMN) 150 may be connected to H-GMLC 142 (e.g. via the Internet) in order to provide location access to UE 102 on behalf of external clients connected to the R-GMLC 152. The R-GMLC 152, H-GMLC 142 and V-GMLC 132 may support location access to the UE 102 using the 3GPP CP location solution defined in 3GPP TS 23.271. It is noted that R-GMLC 152, H-GMLC 142 and V-GMLCs 132, 132# and 137 may each be referred to simply as a GMLC (e.g. if the type of GMLC is already known).

In a CP location solution, such as the 3GPP CP location solution defined in 3GPP TS 23.271, signaling to support location of the UE 102 may be transferred between participating entities (e.g. V-GMLC 132, MME 131, E-SMLC 133, eNB 122 and UE 102) using existing signaling interfaces and protocols for VPLMN EPC 130 and RAN 120. In contrast, in a user plane location solution such as the SUPL location solution defined by the Open Mobile Alliance (OMA), signaling to support location of the UE 102 may be transferred between participating entities (e.g. the UE 102 and a SUPL Location Platform (SLP)) using data bearers (e.g. using the Internet Protocol (IP)).

It should be understood that while a VPLMN network (comprising RAN 120 and VPLMN EPC 130) and separate HPLMN 140, and RPLMN 150 are illustrated in FIG. 1, one or more of the PLMNs (networks) may be the same PLMN. In that case, the HLR/HSS 144 may be in the same network (EPC) as the MME 131, and one or more of the V-GMLC 132, the H-GMLC 142, and R-GMLC 152 may be the same GMLC.

In particular implementations, the UE 102 may have circuitry and processing resources capable of obtaining location related measurements (e.g. for signals received from GPS or other Satellite Positioning System (SPS) satellites 110, cellular transceivers such as eNBs 122, 124, or local transceivers) and possibly computing a position fix or estimated location of UE 102 based on these location related measurements. In some implementations, location related measurements obtained by UE 102 may be transferred to a location server, such as the E-SMLC 133, after which the location server may estimate or determine a location for UE 102 based on the measurements. Location related measurements obtained by UE 102 may include measurements of signals received from satellites 110 belonging to an SPS or Global Navigation Satellite System (GNSS) such as GPS, GLONASS, Galileo or Beidou and/or may include measurements of signals received from terrestrial transmitters fixed at known locations (e.g., such as eNB 122, eNB 124 or other local transceivers). UE 102 or a separate location server (e.g. E-SMLC 133) may then obtain a location estimate for the UE 102 based on these location related measurements using any one of several position methods such as, for example, GNSS, Assisted GNSS (A-GNSS), Advanced Forward Link Trilateration (AFLT), Observed Time Difference Of Arrival (OTDOA), Enhanced Cell ID (E-CID), or Wireless Local Area Network (WLAN) positioning, or combinations thereof. In some of these techniques (e.g. AFLT and OTDOA), timing differences may be measured at UE 102 for three or more terrestrial transmitters fixed at known locations, or (e.g. for A-GNSS) pseudoranges may be measured for four or more satellites with accurately known orbital data, or combinations thereof. These measurements may be based at least in part, on pilots, positioning reference signals (PRS) or other positioning related signals transmitted by the transmitters or satellites and received at the UE 102.

In some implementations, a location server, such as E-SMLC 133, may be capable of providing positioning assistance data to UE 102 including, for example, information regarding signals to be measured (e.g., expected signal timing, signal coding, signal frequencies, signal Doppler), locations and identities of terrestrial transmitters and/or signal, timing and orbital information for GNSS satellites to facilitate positioning techniques such as A-GNSS, AFLT, OTDOA and E-CID. The facilitation may include improving signal acquisition and measurement accuracy by UE 102 and, in some cases, enabling UE 102 to compute its estimated location based on the location measurements. For example, a location server (e.g. E-SMLC 133) may comprise an almanac which indicates locations and identities of cellular transceivers (e.g. eNBs 122 and 124) and/or local transceivers in a particular region or regions such as a particular venue, and may provide information descriptive of signals transmitted by a cellular base station or AP such as transmission power and signal timing. In the case of E-CID, a UE 102 may obtain measurements of signal strengths (e.g. received signal strength indication (RSSI) or reference signal received power (RSRP)) for signals received from cellular transceivers, e.g., eNBs 122, 124 and/or local transceivers and/or may obtain a signal to noise ratio (S/N), signal quality level (e.g. a reference signal received quality (RSRQ)) or a round trip signal propagation time (RTT) between UE 102 and one or more cellular transceivers, e.g., eNBs 122, 124, and/or local transceivers. In the case of E-CID, UE 102 may obtain a global cell ID or physical (local) cell ID for each of one or more nearby cells which may enable an approximate location of UE 102. In the case of WLAN positioning, UE 102 may obtain a Media Access Control (MAC) address for each of one or more nearby WLAN APs which may enable an accurate location for UE 102 due to a short radio range (e.g. 50 meters) for a WLAN AP. A UE 102 may transfer these measurements to a location server, such as E-SMLC 133 or a SUPL SLP (not shown in FIG. 1), to determine a location for UE 102, or in some implementations, may use these measurements together with assistance data (e.g. terrestrial almanac data or GNSS satellite data such as GNSS Almanac and/or GNSS Ephemeris information) received from the location server to determine a location for UE 102.

In the case of OTDOA, UE 102 may measure a Reference Signal Time Difference (RSTD) between signals such as a Positioning Reference Signal (PRS) or Cell-specific Reference Signal (CRS) transmitted by pairs of nearby transceivers and base stations (e.g. eNBs 122 and 124). An RSTD measurement may provide the time of arrival difference between signals (e.g. CRS or PRS) received at UE 102 from two different transceivers (e.g. an RSTD between signals received from eNB 122 and eNB 124). The UE 102 may return the measured RSTDs to a location server (e.g. E-SMLC 133) which may compute an estimated location for UE 102 based on known locations and known signal timing for the measured transceivers. In some implementations of OTDOA, the signals used for RSTD measurements (e.g. PRS or CRS signals) may be accurately synchronized by the transceivers to a common universal time such as GPS time or Coordinated universal time (UTC), e.g., using a GPS receiver at each transceiver to accurately obtain the common universal time.

An estimate of a location of a UE 102 may be referred to as a location, location estimate, location fix, fix, position, position estimate or position fix, and may be geographic, thus providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor). A location of a UE 102 may also be expressed as an area or volume (defined either geographically or in civic form) within which the UE 102 is expected to be located with some probability or confidence level (e.g., 67% or 95%). A location of a UE 102 may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

Triggered location (e.g. based on an area event) and periodic location of a UE 102 at the request of an external client (e.g. external client 160) are defined for GSM and UMTS access by UE 102 in 3GPP TS 23.271 using Mobile Terminated Location Request (MT-LR) procedures. Different MT-LR procedures are defined in 3GPP TS 23.271 to support periodic location of a UE 102 (using an MT-LR procedure for periodic location) and triggered location of a UE 102 where the UE 102 enters, leaves or remains within a defined geographic area (using an MT-LR procedure for a change of area event). However, such MT-LR procedures (e.g. an MT-LR procedure for periodic location or a change of area event) are not defined in 3GPP TS 23.271 for E-UTRAN access by the UE 102 (e.g. using LTE or NB-IoT). In the case of CIoT features used by a UE 102, a capability is defined in 3GPP TS 23.682 to support reporting of a change in location for the UE 102, but the solution is not aligned with location support in 3GPP TS 23.271 (e.g. since the capability in 3GPP TS 23.682 uses a different architecture and different protocols to the solution in 3GPP TS 23.271), provides location with a granularity only of cell ID or Tracking Area (TA) and can only report location when a UE 102 becomes available (e.g. potentially at an interval of almost three hours in the case of a long eDRX paging cycle for UE 102).

A more flexible periodic and/or triggered MT-LR capability may be useful to enable location of a UE 102 that has LTE access, category M1 access or NB-IoT access at times other than when the UE 102 normally becomes available (e.g. connected to the VPLMN EPC 130) and/or with better granularity than a cell ID or TA. For example, a user might like to know when a valuable asset, child or pet enters or leaves a particular area immediately after the event occurs, rather than say two hours later, and in addition may prefer a more accurate current location when such an event occurs.

A single procedure (e.g. MT-LR procedure) may be used to support different types of periodic and triggered location. Examples of this single procedure herein are referred to as a "periodic and triggered location", a "periodic and triggered MT-LR", a "periodic and triggered MT-LR location", a "periodic and triggered location determination", a "periodic location and triggered location", a "periodic or triggered location", a "periodic location determination and triggered location determination", or a "periodic location determination or triggered location determination". Moreover, a request for this single procedure may be herein referred to as a "periodic and triggered location request", a "periodic and triggered MT-LR request", a "periodic and triggered MT-LR location request", a "periodic location and triggered location service request", a "periodic or triggered location request", a "periodic location request and triggered location request", or a "periodic location request or triggered location request". Use of a single procedure supporting periodic and different types of triggered location reporting may be preferable to separate procedures that each support one type of reporting only (e.g. periodic reporting only or reporting of area events only) due to reducing the implementation for a UE 102 and/or for network elements such as MME 131 and GMLCs 132, 142 and 152. The procedure may be usable for both a UE 102 that is normally reachable at any time and for an IoT UE 102 that is unreachable for long periods. The procedure may contains several features to support location services, e.g., for IoT UEs. In one feature of the procedure, after an LCS client (e.g. external client 160) requests a network (e.g. R-GMLC 152) to initiate periodic and triggered location reporting for a target UE (e.g. UE 102), two intermediate responses may be returned by the network (e.g. by MME 131) to the LCS client. The first response, which may normally be returned within a few seconds, may indicate that the LCS client request has been accepted by the network or networks (e.g. by R-GMLC 152, H-GMLC-142, V-GMLC-132 and MME 131) and the network (e.g. an MME 131) is ready to initiate the procedure in the target UE. The second response, which may be returned soon after the first response for a normal UE (e.g. a few seconds later) or may be returned several hours or days after the first response for an IoT UE, may indicate that the periodic and triggered location request has been activated in the UE. Unlike conventional procedures, which do not provide such a second response, the second response may inform the LCS client that the target UE will begin to return periodic and triggered location reports.

Following activation of periodic and triggered location reporting in a UE (e.g. UE 102), the UE may report the requested type(s) of periodic and/or triggered events as these occur and are detected by the UE, and may include with these reports location estimates (or the network may include location estimates). When, however, trigger events do not occur (e.g. the UE remains within a geofence area and does not need to report this), the network (e.g. R-GMLC 152 and H-GMLC-142) and LCS client (e.g., external client 160) may not receive any location reports, making it impossible for the network or LCS client to know whether the location request is still active in the UE or was terminated (e.g. due to the UE being powered off). Conventionally, an additional query procedure may be used which allows an LCS client or network entity (e.g. GMLC) to query the UE for ongoing active location sessions. The use of an additional query to determine the current status of the location session with the UE, however, may add impact to the wireless network and UE and may lead to a delayed response when a UE in idle state is not reachable for a long period. A more efficient solution with less delay may be provided by another feature of the procedure described herein, in which a maximum reporting interval is provided for a periodic and triggered location request for a triggered event (e.g. area event reporting) to force a UE to issue a location report even when no normal reporting event has occurred. The location report can confirm to the network (e.g. R-GMLC 152 and H-GMLC 142) and LCS client (e.g. LCS Client 160) that location reporting is still active in the UE. If no location report is received following a maximum reporting interval, an LCS client or network (e.g. R-GMLC 152 and H-GMLC 142) can assume that location reporting was terminated in the UE.

The periodic and triggered location for EPC services may support instigation of location reporting at periodic intervals or whenever some trigger event is detected by the UE and cancellation of location reporting (e.g. by the UE or LCS client). The supported trigger events for location reporting, for example, may comprise an area event (e.g. where a UE enters, leaves or remains within a predefined area) and a motion event. In one implementation, only one type of reporting may be included in any request from among periodic, area event and motion event. In another implementation, more than one type of reporting may be supported for the same periodic and triggered location procedure (e.g. from among periodic, area event and motion event reporting). In the case of the area event, a target area may be defined, e.g., by a geographical area, PLMN identity, set of cells and/or TAs for a PLMN, country or geopolitical name. In the case of a motion event, motion may correspond, e.g., to movement by the UE exceeding a linear distance threshold from a previous location for the UE at which a motion event was reported by the UE. The procedure may support UE mobility between different serving MMEs and different serving PLMNs without interruption of event reporting.

Figure 2:
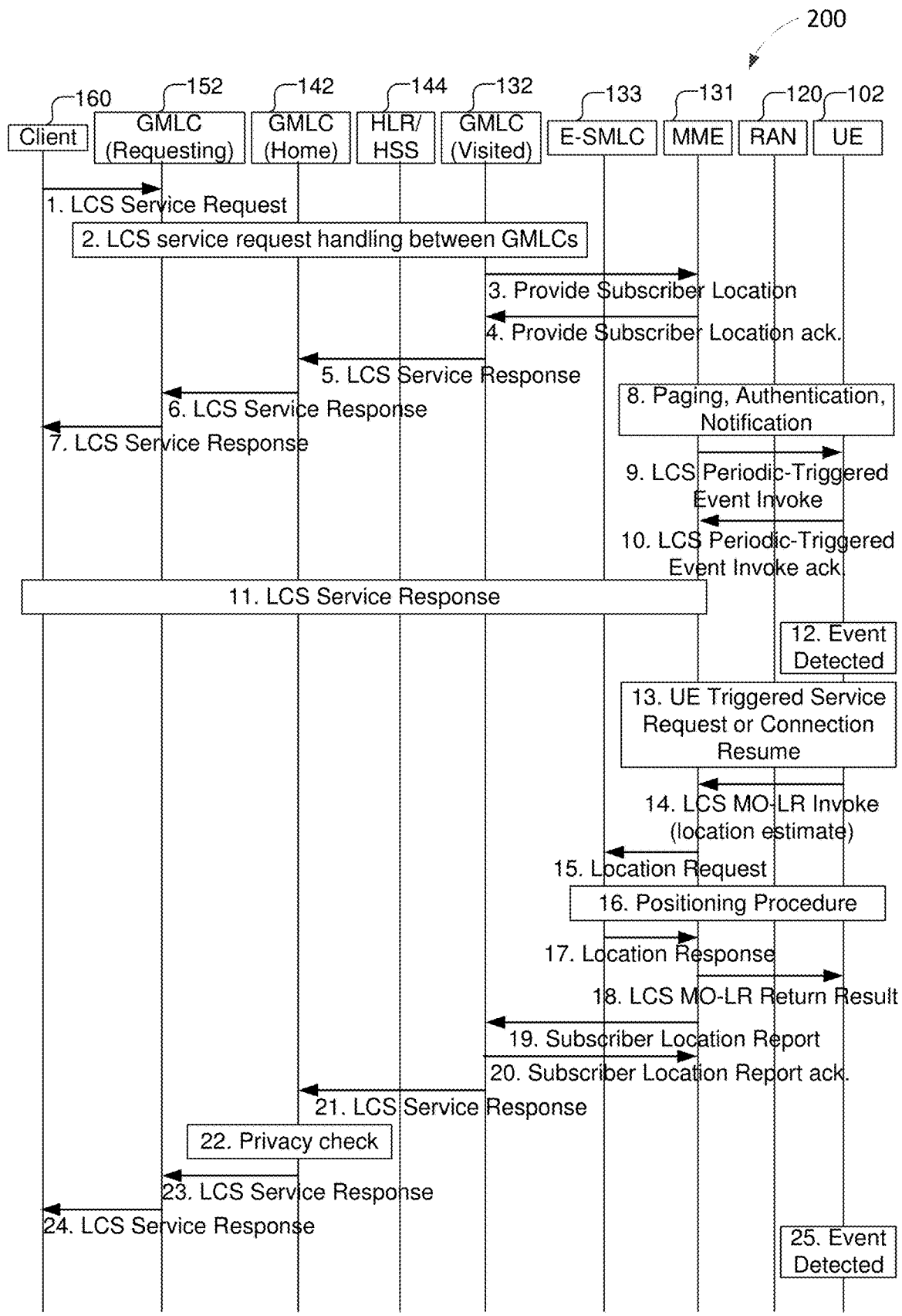
FIG. 2 is a signaling flow illustrating a process used to instigate and perform a periodic and triggered location request.
Figure 3:
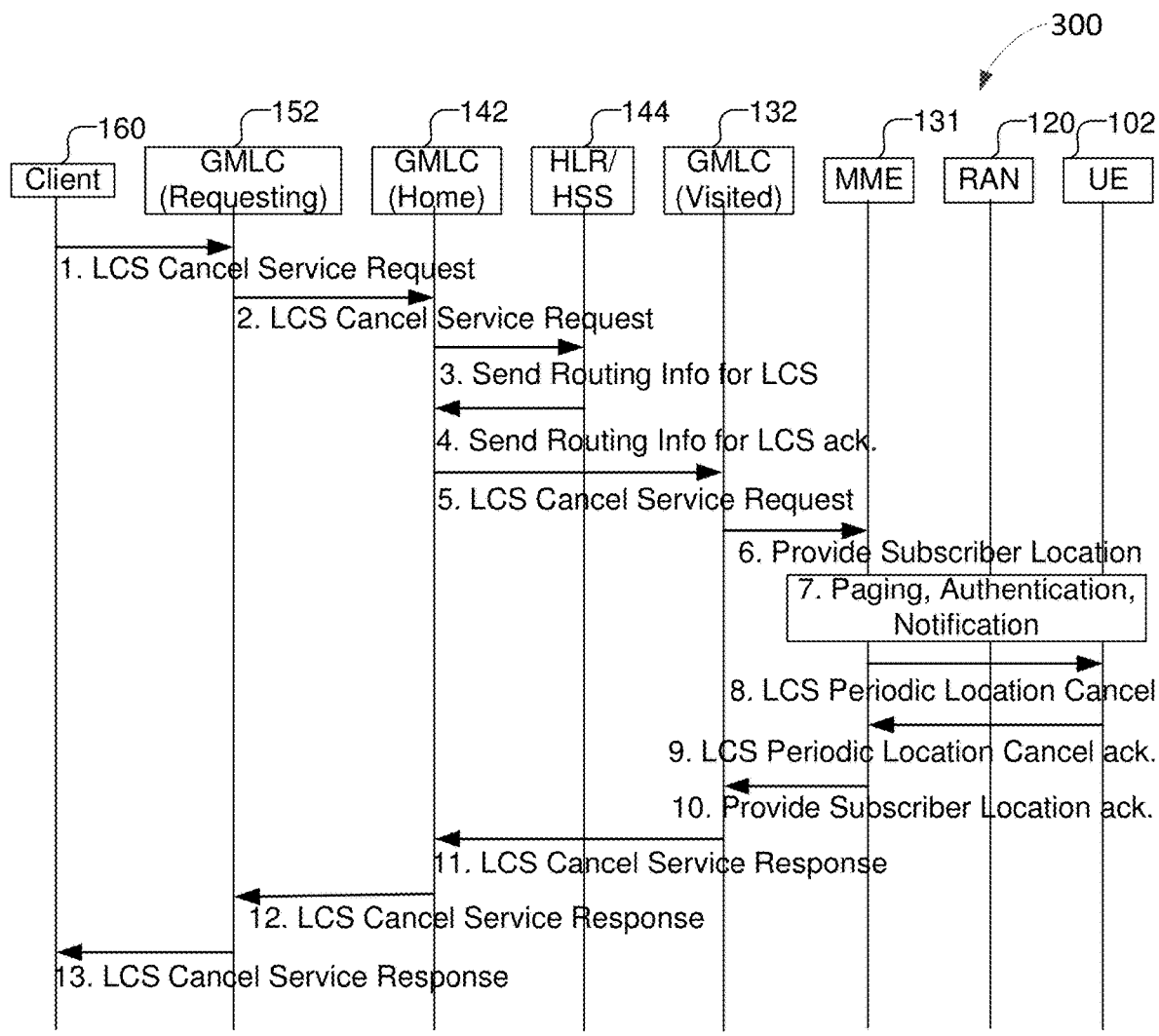
FIG. 3 is a signaling flow illustrating a process for cancelling a periodic and triggered location procedure when cancellation is requested by an LCS Client.
Figure 4:
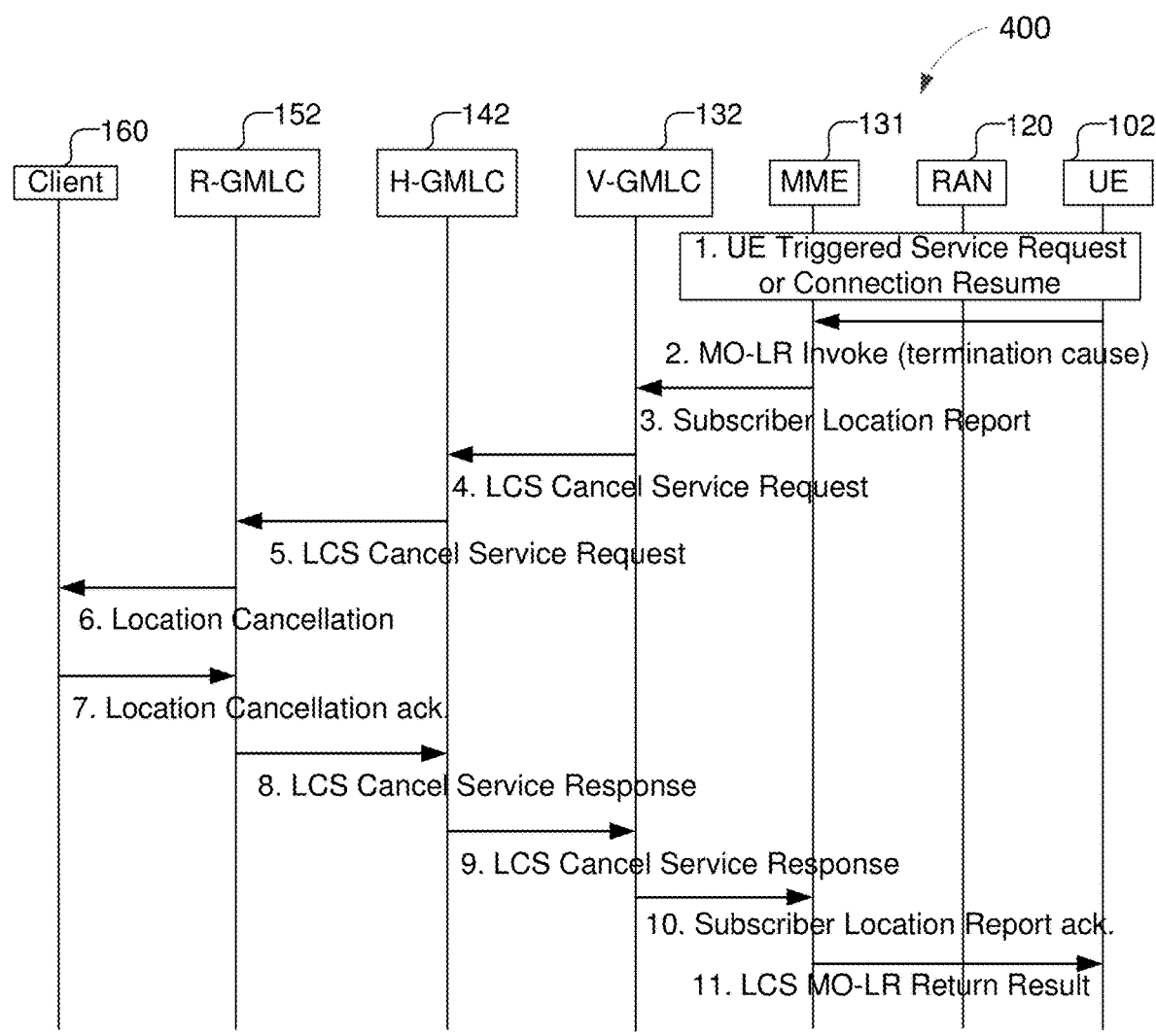
FIG. 4 is a signaling flow illustrating a process for cancelling a periodic and triggered location procedure when cancellation is requested by a UE.

FIG. 2 shows a signaling flow 200 illustrating a process used to instigate and perform event and location reporting for a periodic and triggered MT-LR requested by an LCS client and for a target UE with LTE and/or NB-IoT wireless access. The example in FIG. 2, and the examples shown later in FIGS. 3 and 4, apply to UE 102 in system architecture 100, where elements from system architecture 100 are shown in FIGS. 2-4 using like numbers. As illustrated in signaling flow 200, at stage 1, an LCS Client 160 sends an LCS Service Request to R-GMLC 152, which provides the type of location (or location event) reporting being requested (e.g. entering into an area, leaving from an area, being inside an area, periodic reporting or motion event reporting) and associated parameters. In this example, it is assumed that only one type of location reporting is requested at stage 1 (e.g. such as requesting reporting at stage 1 of periodic events but not area events or motion events). However, other examples may exist in which more than one type of locating reporting is requested (e.g. such as requesting at stage 1 reporting of both periodic events and motion events). For any type of reporting, the LCS Service Request may include an identity for UE 102, e.g. a Mobile Station International Subscriber Directory Number (MSISDN), an International Mobile Subscriber Number (IMSI) or some other identity known to LCS Client 160 and R-GMLC 152. For periodic reporting, for example, the LCS Service Request may further include the time interval between successive location reports, the total number of reports and may include a location Quality of Service (QoS) which may include a required location accuracy. For area event reporting (e.g. entering into an area, leaving from an area or being inside an area), for example, the LCS Service Request may further include details of the target area (e.g. a definition of a geographic or civic target area), whether the event to be reported is the UE being inside, entering into or leaving the target area, a duration of event reporting, a minimum and/or a maximum time interval between successive event reports, a maximum event sampling interval, whether location estimates may be included in event reports (and an associated location QoS), and whether only one location report is required or more than one. If the target area is expressed by a local coordinate system, civic location or a geopolitical name, the R-GMLC 152 may convert the target area to a geographical area expressed by a geographic shape such a circle, ellipse or polygon (e.g. as defined in 3GPP TS 23.032). For motion event reporting, for example, the LCS Service Request may further include a threshold linear distance of movement by UE 102 to trigger a motion event report, a duration of event reporting, a minimum and/or maximum time interval between successive event reports, a maximum event sampling interval, whether location estimates may be included in event reports (and an associated location QoS), and whether only one location report is required or more than one. In some embodiments, LCS Client 160 may have received information for the LCS Service Request sent at stage 1 from another entity (e.g. a user of LCS Client 160) (not shown in FIG. 2).

At stage 2, LCS service request handling is performed between GMLCs 152, 142, and 132. The LCS service request handling at stage 2 may include one or more of: (i) querying and obtaining from HLR/HSS 144 by R-GMLC 152 for one or more of an H-GMLC 142 address, a V-GMLC 132 address, an address of serving MME 131 and/or an additional identity (e.g. MSISDN or IMSI) for UE 102; (ii) forwarding the LCS service request by R-GMLC 152 to H-GMLC 142; (iii) performing a privacy and authorization verification on the LCS service request by H-GMLC 142; and (iv) querying and obtaining from HLR/HSS 144 by H-GMLC 142 for one or more of a V-GMLC 132 address, an address of serving MME 131 and/or an additional identity (e.g. MSISDN or IMSI) for UE 102. As part of LCS service request handling at stage 2, H-GMLC 142 may record the received information and parameters in the LCS service request. H-GMLC 142 may also assign a Location Deferred Request (LDR) reference number to the LCS Service request and an optional list of reporting PLMNs (which should include the serving PLMN corresponding to VPLMN EPC 130 in this example), e.g., based on the user-related and subscription-related information for UE 102 received from HLR/HSS 144 or configured in advance in H-GMLC 142. H-GMLC 142 then transfers the LCS service request to V-GMLC 132, and includes the LDR reference number, the H-GMLC 142 address, any optional list of reporting PLMNs and an optional request for privacy notification or verification by UE 102 and/or the user of UE 102. In the case that the LCS service request at stage 1 is sent by LCS Client 160 to H-GMLC 142 directly and not via R-GMLC 152 (e.g. where R-GMLC 152 is the same as H-GMLC 142), the actions just described for R-GMLC 152 for stage 2 may be omitted. In the case that H-GMLC 142 is the same as V-GMLC 132 (e.g. when VPLMN EPC 130 is part of HPLMN 140), sending of the LCS service request from H-GMLC 142 to V-GMLC 132 may be omitted.

At stage 3, in case area event reporting is requested, if the target area is defined by a geographic shape (e.g. as defined in 3GPP TS 23.032), V-GMLC 132 may convert the target area into a corresponding list of cell identities and/or tracking areas (TAs) defined for RAN 120. If V-GMLC 132 cannot convert the entire target area into network identities such as cell identities and tracking areas, V-GMLC 132 may reject the request and send an LCS service response to H-GMLC 142 with an error cause (not shown in FIG. 2). Otherwise, V-GMLC 132 sends the location request and associated parameters to MME 131, e.g. in a Provide Subscriber Location request message, including details of the events to be reported, the LDR reference number, the H-GMLC 142 address, any optional list of reporting PLMNs and any optional request for privacy notification or verification. MME 131 may be the serving MME for UE 102 and may be identified from information provided by HLR/HSS 144 to R-GMLC 152 or H-GMLC 142 in response to a query as described previously for stage 2.

At stage 4, MME 131 may verify UE 102 capabilities with regard to support of location service related call independent supplementary services (e.g. a notification for LCS), which may have been previously provided to MME 131 by HLR/HSS 144 as part of UE 102 subscription information (e.g. when UE 102 first attaches to VPLMN EPC 130 or performs a tracking area update, not shown in FIG. 2). If UE 102 does not support location service related call independent supplementary services or if MME 131 does not support the location request for periodic and triggered location (for temporary or permanent reasons), a Provide Subscriber Location error response may be returned with a suitable error cause by MME 131 to V-GMLC 132 (not shown in FIG. 2). Otherwise, MME 131 returns an acknowledgment, e.g. a Provide Subscriber Location Acknowledgment (Ack) message, to V-GMLC 132 to confirm that the request has been accepted by MME 131. In an aspect, the acknowledgment may include an indication of the expected time interval or maximum time interval until UE 102 next becomes reachable if UE 102 is currently not reachable (e.g. which may be based on the amount of time remaining for an eDRX cycle or a period of PSM). In an aspect, the acknowledgment may also or instead include a last known location for UE 102, e.g. if available based on information for UE 102 stored at MME 131. The Provide Subscriber Location request message at stage 3 and the Provide Subscriber Location Acknowledgment message at stage 4 may be as defined for the EPC LCS Protocol (ELP) in 3GPP TS 29.172.

In some implementations, there may be no UE 102 capability information directly indicating support of a periodic and triggered location request. However, if UE 102 supports at least one location service related call independent supplementary service (e.g. such as notification for LCS), MME 131 may assume support for periodic and triggered location in some embodiments. In these embodiments, if UE 102 does not recognize the request sent later at stage 9, UE 102 may return an error response (e.g. a Facility Rejected indication) at stage 10 (e.g. as defined in 3GPP TS 24.008) to MME 131 in which case, MME 131 may terminate the request by instigating stages 19-24 of signaling flow 200 with an appropriate error cause in the message (e.g. a Subscriber Location Report) sent at stage 19.

At stages 5-7, V-GMLC 132 returns the LCS Service Response via H-GMLC 142 and R-GMLC 152 to LCS Client 160 to notify whether the periodic and triggered location request was accepted or not. LCS Client 160 may then return the notification to another entity (e.g. a user of LCS Client 160) (not shown in FIG. 2). When H-GMLC 142 returns the LCS Service Response to R-GMLC 152 at stage 6, the LDR reference number assigned by H-GMLC 142 at stage 2 may be included, and R-GMLC 152 may then transfer the LDR reference number, or another reference number assigned by the R-GMLC 152, to LCS Client 160 in the LCS Service Response at stage 7. The LCS Service Response returned at stages 5-7 may also include the indication of the expected or maximum time interval until UE 102 next becomes reachable and/or a last known location for UE 102 if either of these were included at stage 4. It is noted that when R-GMLC 152 is the same as H-GMLC 142, stage 6 may be omitted and when H-GMLC 142 is the same as V-GMLC 132, stage 5 may be omitted.

It is noted that neither the message (e.g. Provide Subscriber Location Ack.) at stage 4 nor the LCS Service Response at stages 5-7 may confirm that location reporting was activated in UE 102 or that UE 102 may necessarily be able to support the request. However, the message (e.g. Provide Subscriber Location Ack.) at stage 4 and the LCS Service Response at stages 5-7 may confirm the capability and intent to support the request on the network side and may be useful to LCS Client 160 when a response from UE 102 is delayed due to UE 102 being temporarily unreachable (e.g. if in idle state due to PSM or eDRX). The Provide Subscriber Location Ack. at stage 4 and the LCS Service Response at stages 5-7 may correspond to the first of the two responses referred to previously for the first feature comprising returning two intermediate responses by a network to an LCS client.

At stage 8, if UE 102 is currently not reachable (e.g. when in PSM or with eDRX), MME 131 waits until the UE 102 again becomes reachable (e.g. when the UE 102 can again be paged at the end of an eDRX cycle or again requests a signaling connection to RAN 120 if in PSM). When UE 102 becomes reachable, UE 102 may request the establishment of a signaling connection to VPLMN EPC 130 via RAN 120, in which case UE 102 and MME 131 may establish the signaling connection and perform authentication and ciphering. Alternatively, if UE 102 is in idle state (e.g. in an EPS Connection Management IDLE (ECM-IDLE) state) after becoming reachable, MME 131 may perform paging, and UE 102 and MME 131 may then perform authentication and ciphering to establish a signaling connection to UE 102. If privacy notification/verification was requested (e.g. at stage 3 or according to subscription information for UE 102 obtained by MME 131 from HLR/HSS 144) and UE 102 supports location service related call independent supplementary services, MME 131 may send an LCS Location Notification Invoke message to UE 102, as part of stage 8, with a location type indicating activation of a deferred location request, a deferred location event type indicating the type of location reporting event (i.e. entering into area, leaving from area, being inside area, periodic or motion) and an indication as to whether privacy verification is required. If privacy verification was requested, UE 102 may return an LCS Location Notification Return Result message to MME 131 as part of stage 8 indicating whether permission for the location request is granted or denied (e.g. by the user of UE 102). If UE 102 denies permission or does not return a response when a response is required, MME 131 may terminate the request as described further down for stage 11. In an aspect, if UE 102 changes serving MME 131 (e.g. to a new serving MME such as MME 131#) before becoming reachable from MME 131, MME 131 may return a message, e.g. a Subscriber Location Report message, to V-GMLC 132 indicating a change of MME 131 and may include the new MME 131 address if available (e.g. an address for MME 131# when MME131# is the new serving MME) (not shown in FIG. 2). In this aspect, V-GMLC 132 may then forward the error to LCS Client 160 via H-GMLC 142 and R-GMLC 152 or may repeat stage 3 to transfer the periodic and triggered location request to the new MME (e.g. MME 131#) if provided by MME 131 (not shown in FIG. 2). In this aspect, when stage 4 is performed again later by the new MME (e.g. MME 131#), V-GMLC 132 may not repeat stages 5-7 as LCS client 160 was already informed of network acceptance of the request when stages 5-7 were performed initially.

Returning to signaling flow 200 for a normal (successful) procedure where the procedure is not terminated and is not directed to another MME, at stage 9, MME 131 sends a message, e.g. an LCS Periodic-Triggered Invoke message, to UE 102 carrying all of the event related information received from V-GMLC 132 at stage 3, including the type of location reporting event (e.g. entering into an area, leaving from an area, being inside an area, periodic reporting or motion event reporting), the LDR reference number, the H-GMLC 142 address, the optional list of reporting PLMNs if provided and any requested QoS in the case that location estimates are required.

At stage 10, if the UE 102 supports periodic and triggered location according to the request received at stage 9 and currently has resources to service the request, UE 102 sends an acknowledgement to MME 131 confirming that the periodic and triggered location request has been accepted by and activated in UE 102. Otherwise, UE 102 may send a return error response to MME 131 with a suitable error cause. The LCS Periodic-Triggered Invoke message at stage 9 and any acknowledgment at stage 10 may be as defined in 3GPP TS 24.080.

At stage 11, if UE 102 cannot support the periodic and triggered location request, a message, e.g. a Subscriber Location Report message, may be returned to V-GMLC 132 by MME 131 with a suitable error cause and including the LDR reference number and H-GMLC 142 address. Otherwise, if UE 102 confirms support of the periodic and triggered location request at stage 10, a message, e.g. a Subscriber Location Report message, may be returned to V-GMLC 132 by MME 131 as part of stage 11 indicating that event reporting was activated in UE 102 and including the LDR reference number and H-GMLC 142 address received at stage 3. If location estimates are required for subsequent event reports (e.g. as indicated at stage 3), MME 131 may obtain the current location of UE 102 (e.g. as at stages 15-17 described later) and may include the location estimate in the message sent to V-GMLC 132 (e.g. and which V-GMLC 132 may acknowledge to MME 131). As part of stage 11, V-GMLC 132 then returns an LCS Service Response via H-GMLC 142 and R-GMLC 152 to LCS Client 160 to notify whether the periodic and triggered location request was activated in UE 102. When H-GMLC 142 returns the LCS Service Response to R-GMLC 152 as part of stage 11, the LDR reference number assigned by H-GMLC 142 and the H-GMLC 142 address may be included, and R-GMLC 152 may transfer the LDR reference number to LCS Client 160 in the LCS Service Response as part of stage 11. LCS Client 160 may then return the response to another entity (e.g. a user of LCS Client 160) (not shown in FIG. 2). V-GMLC 132, H-GMLC 142 and/or R-GMLC 152 may also record charging information for the request as part of stage 11. Following stage 11, MME 131 and V-GMLC 132 may release all resources for the request including any state information. It is noted that the Subscriber Location Report message and the LCS Service Response with an activation indication described above for stage 11 may each correspond to the second of the two responses referred to previously for the first feature comprising returning two intermediate responses by a network to an LCS client (e.g. and may confirm to LCS client 160 that location (or location event) reporting has started in UE 102). The Subscriber Location Report message and associated acknowledgment message at stage 11 may be as defined for the EPC LCS Protocol (ELP) in 3GPP TS 29.172.

At stage 12, for the area event or motion event, UE 102 monitors the requested event (or trigger event) at intervals equal to or less than the maximum event sampling interval received at stage 9. If no maximum event sampling interval was received at stage 9 (e.g. due to not being included by LCS client 160 at stage 1 or by H-GMLC 142 as part of stage 2), UE 102 may used a default maximum event sampling interval. The use of a maximum event sampling interval at stage 12 may correspond to the third feature previously described herein comprising a maximum event sampling interval and may enable a limitation or reduction in UE 102 power and/or battery consumption for event monitoring and a limitation on the maximum delay in detecting an event as described previously. An event (or trigger event) may be detected by UE 102 when any of the following occur: (i) a requested area event (e.g. entering into an area, leaving from an area or being inside an area) or requested motion event has been detected by UE 102 and the minimum reporting interval (if included at stage 9) has elapsed since the last report at stage 14 (if this is not the first event report); (ii) a requested periodic location event has occurred; or (iii) the maximum reporting interval for an area event or motion event has expired. An event trigger corresponding to alternative (iii) and its subsequent reporting as described further on in association with stages 13 to 24 may support the event reporting described previously for the second feature of the present procedure comprising a maximum reporting interval for a periodic and triggered location request for a triggered event, and may enable network entities (e.g. R-GMLC 152 and H-GMLC 142) and LCS Client 160 to determine whether periodic and triggered location reporting is still active in UE 102.

When an event trigger is detected by the UE at stage 12, the UE 102 proceeds to stage 13 once the UE 102 can register (e.g. using RAN 120) with a PLMN in the optional list of reporting PLMNs received at stage 9 or with the original serving PLMN if no list of reporting PLMNs was provided or if the UE 102 does not support the optional list of reporting PLMNs. If UE 102 cannot register with a permitted PLMN, UE 102 may wait until a permitted PLMN can be accessed in order to report the event, or for the periodic and triggered location request to terminate due to cancellation by LCS Client 160, cancellation by UE 102 or expiration of the allowed duration for reporting. It is noted that if UE 102 uses a different serving PLMN to report occurrence of an area event, UE 102 may still continue to use the target area provided by the original serving PLMN (e.g. VPLMN EPC 130 in this example) which contains cell IDs and/or TAs for the original serving PLMN. The restriction to use only permitted PLMNs may not affect PLMN selection by UE 102.

At stage 13, if UE 102 is in idle (e.g. ECM-IDLE) state, UE 102 may perform a UE triggered service request or connection resume (e.g. as defined in 3GPP TS 23.401) in order to obtain a signaling connection via RAN 120 to serving MME 131. It is noted that MME 131 and V-GMLC 132 for stages 13 to 24 may be different than the MME 131 and V-GMLC 132 for stages 1 to 11 but may still belong to VPLMN EPC 130. In another example of a periodic and triggered location request (not shown in FIG. 2), UE 102 may attach at stage 13 to another PLMN EPC different to VPLMN EPC 130, in which case MME 131, V-GMLC 132 and E-SMLC 133 shown in FIG. 2 for stages 13 to 24 may be replaced by an MME, V-GMLC and E-SMLC for this other PLMN. For example, UE 102 may attach to VPLMN EPC 134 in system architecture 100 via RAN 126, in which case MME 131, V-GMLC 132 and E-SMLC 133 shown in FIG. 2 for stages 13 to 24 may be replaced by MME 135, V-GMLC 137 and E-SMLC 136, respectively. Such attachment to another PLMN may occur if UE 102 is not able to access VPLMN EPC 130 following stage 12 (e.g. if UE 102 is not in coverage of RAN 120) but is able to access the other PLMN (e.g. is able to access VPLMN EPC 134 due to being in coverage of RAN 126).

At stage 14, UE 102 may send an LCS Mobile Originated Location Request (MO-LR) Invoke message to MME 131 indicating an event report for a deferred periodic and triggered location request. The LCS MO-LR Invoke message may include the type of event being reported (e.g. entering into an area, leaving from an area, being inside an area, a periodic event, a motion event or expiration of the maximum reporting interval), the LDR reference number, the H-GMLC 142 address and whether a location estimate is required. When a location estimate is required (e.g. for a periodic location event or for an area event or motion event if requested by LCS client 160), UE 102 may include any QoS received at stage 9 and a location estimate if a location estimate is currently available to UE 102. UE 102 may also indicate whether the periodic and triggered location request is now terminated in the UE 102 (e.g. due to expiration of the reporting duration or because only one event report was requested). It is noted that provision of a location estimate by UE 102 at stage 14 when requested at stage 9 may apply in some aspects, to an event corresponding to expiration of the maximum reporting interval for an area event or motion event. The LCS MO-LR Invoke message sent at stage 14 and the LCS MO-LR Return Result message described later for stage 18 may be as defined in 3GPP TS 24.080.

In a scenario where UE 102 does not send the LCS MO-LR Invoke message at stage 14 at or before the expiration of the maximum reporting interval (e.g. because UE 102 was powered off or is not able to access VPLMN EPC 130 or another allowed PLMN following stage 12), one or more of LCS Client 160, H-GMLC 142 or R-GMLC 152 may determine that UE 102 is no longer able to support the periodic and triggered MT-LR due to not responding prior to the maximum reporting interval. In this scenario (not shown in FIG. 2), LCS Client 160, H-GMLC 142 and/or R-GMLC 152 may cancel the periodic and triggered location request—e.g. as described for FIGS. 3 and 4 below.

Returning to FIG. 2, if UE 102 indicates that a location estimate is required at stage 14, MME 131 may instigate location of the UE 102 by sending a location request message for UE 102 to E-SMLC 133 at stage 15. E-SMLC 133 may then obtain a location for UE 102 at stage 16 using a control plane location solution as described previously herein. For example, E-SMLC 133 may exchange positioning protocol messages (e.g. messages for the LTE Positioning Protocol (LPP) defined in 3GPP TS 36.355) with UE 102 at stage 16 (not shown in FIG. 2) and/or may exchange positioning protocol messages (e.g. for the LPP A (LPPa) protocol defined in 3GPP TS 36.455) with a serving eNB for UE 102 in RAN 120 such as eNB 122 at stage 16 (not shown in FIG. 2). The positioning protocol messages may be exchanged via MME 131 and (e.g. for LPP messages) via RAN 120. E-SMLC 133 may use the positioning protocol messages (e.g. LPP messages) to request and receive location measurements from UE 102 (e.g. for A-GNSS, OTDOA, E-CID or WLAN positioning) and/or may use the positioning protocol messages (e.g. LPPa messages) to request and receive location measurements (e.g. for E-CID positioning) from a serving eNB for UE 102 such as eNB 122. E-SMLC 133 may also use the positioning protocol messages (e.g. LPP messages) to provide assistance data to UE 102 to help enable UE 102 to obtain location measurements (e.g. for A-GNSS, OTDOA, E-CID or WLAN positioning) and possibly to compute a location estimate from these location measurements. E-SMLC 133 may then determine (or verify) a location estimate for UE 102 from the received location measurements (e.g. according to the A-GNSS, OTDOA, E-CID or WLAN position methods) and may return the location estimate to MME 131 at stage 17. If a location estimate is provided by UE 102 at stage 14, stages 15-17 may be omitted by MME 131 (e.g. depending on configuration information in MME 131) or MME 131 may perform steps 15-17 and may include the location estimate provided by UE 102 at stage 14 in the location request sent to E-SMLC 133 at stage 15.

At stage 18, MME 131 sends an MO-LR Return Result message to UE 102 confirming that the location event report will be sent. If MME 131 is unable to send the location event report (e.g. because this capability is not supported by MME 131), an MO-LR return error may be returned instead to UE 102 (not shown in FIG. 2). UE 102 may then terminate the periodic and triggered location procedure after an implementation defined number of such MO-LR return errors are received.

Assuming that MME 131 is able to send the location event report, then at stage 19, MME 131 selects a V-GMLC 132 in the same network (e.g. in VPLMN EPC 130) and sends a message, e.g. a Subscriber Location Report message, to V-GMLC 132 with an indication of the type of event (or location event) being reported (e.g. entering into an area, leaving from an area, being inside an area, a periodic event, a motion event or expiration of the maximum reporting interval), the LDR reference number, the H-GMLC 142 address, any location estimate received at stage 14 or obtained at stages 15-17 and optionally information on positioning methods used for the location estimate. The MME 131 may also include the UE 102 IMSI or MSISDN and may indicate whether the periodic and triggered MT-LR is now terminated in UE 102 (e.g. if indicated as such by UE 102 at stage 14).

At stage 20, V-GMLC 132 sends an acknowledgement message to MME 131 and MME 131 may record charging information. The Subscriber Location Report message at stage 19 and acknowledgment message at stage 20 may be as defined for the ELP protocol.

At stage 21, the V-GMLC 132 forwards the information received at stage 19 to H-GMLC 142 as identified by the H-GMLC 142 address received at stage 19. V-GMLC 132 may record charging information.

At stage 22, H-GMLC 142 identifies the location request to which the message received at stage 21 applies using the LDR reference number and/or IMSI or MSISDN received at stage 21. H-GMLC 142 may also perform a privacy check at stage 22 (e.g. may determine whether to forward the information received at stage 21 towards LCS Client 160 at stage 23).

At stage 23, H-GMLC 142 forwards the information received from V-GMLC 132 in an LCS Service Response to R-GMLC 152. If UE 102 indicates termination of the location request, the periodic and triggered MT-LR location request may be completed in H-GMLC 142. The H-GMLC 142 may record charging information.

At stage 24, R-GMLC 152 transfers the event report and any included location estimate to LCS Client 160. LCS Client 160 may then transfer the event report and any included location to another entity (e.g. a user of LCS Client 160) (not shown in FIG. 2). If UE 102 indicates termination of the periodic and triggered MT-LR location request, the location request may be completed in R-GMLC 152. R-GMLC 152 may record charging information. It is noted that when R-GMLC 152 is the same as H-GMLC 142, stage 23 may be omitted and when H-GMLC 142 is the same as V-GMLC 132, stage 21 may be omitted.

At stage 25, if UE 102 did not terminate the location request following stage 18, UE 102 may continue to monitor for the requested event as at stage 12 and may report each occurrence of the requested event as at stages 13-24 until expiration of the requested duration or until the UE 102 or LCS Client 160 terminates reporting for other reasons.

FIG. 3 shows a signaling flow 300 illustrating a procedure for cancelling a deferred location request for periodic and triggered location when cancellation is requested by LCS Client 160. It is assumed for signaling flow 300 that a periodic and triggered MT-LR is successfully started for UE 102 as described for signaling flow 200 and that stages 1-7 or stages 1-11 and possibly some occurrences of stages 12-24 of signaling flow 200 have been already successfully performed.

At stage 1 in signaling flow 300, LCS Client 160 requests the cancellation of the previously requested periodic and triggered MT-LR location request. The LDR (or other) reference number that was included in the previous LCS Service Response sent by R-GMLC 152 to LCS Client 160 (e.g. as at stage 7 or stage 11 of signaling flow 200) may be included in the request sent at stage 1 for signaling flow 300 to indicate which ongoing location request should be cancelled.

At stage 2, R-GMLC 152 sends the cancellation request to H-GMLC 142, including the LDR reference number. In some scenarios (not shown in FIG. 3), R-GMLC 152 may itself initiate the cancellation, e.g. whenever R-GMLC 152 infers from the absence of location reports for a long period that the location request may have been terminated by UE 102.

At stage 3, H-GMLC 142 may send a message (e.g. a SEND_ROUTING_INFO_FOR_LCS message) to HLR/HSS 144 with the IMSI or MSISDN of UE 102 to query for a current VPLMN for UE 102. This may be needed if UE 102 is no longer served by the original V-PLMN EPC 130 or by the original MME 131.

At stage 4, HLR/HSS 144 returns the current serving MME 131 address for UE 102 and the V-GMLC 132 address. It is noted that the MME 131 and V-GMLC 132 indicated by HLR/HSS 144 at stage 4 may be different from the original MME 131 and V-GMLC 132 used for stages 1-11 in signaling flow 200 when the periodic and triggered MT-LR was first started.

At stage 5, H-GMLC 142 forwards the LCS Cancel Service Request to V-GMLC 132 with the LDR reference number received from R-GMLC 152, the H-GMLC 142 address, the serving MME 131 address (e.g. received from HLR/HSS 144 at stage 4) and possibly the IMSI or MSISDN for UE 102. In some scenarios (not shown in FIG. 3), H-GMLC 142 may itself initiate the cancellation procedure (e.g. when a privacy profile for UE 102 stored in H-GMLC 142 was changed in a manner that no longer allows LCS Client 160 to receive event and location reports for UE 102).

At stage 6, V-GMLC 132 sends a message, e.g. a Provide Subscriber Location request message, to serving MME 131, indicating a cancellation of a deferred location request and including the LDR reference number and the H-GMLC 142 address (and possibly the UE 102 IMSI or MSISDN) received from H-GMLC 142 at stage 5. V-GMLC 132 may transfer the location cancellation even when V-GMLC 132 was not involved in establishing the location request (e.g. according to signaling flow 200). The Provide Subscriber Location request message at stage 6 and the Provide Subscriber Location Ack. message described later for stage 10 may be as defined for the EPC Protocol.

At stage 7, if the UE 102 is currently not reachable (e.g. during an eDRX cycle or when in PSM), MME 131 may wait until UE 102 becomes reachable. When UE 102 becomes reachable, if the UE 102 is in idle state (e.g. ECM-IDLE state), MME 131 performs paging, authentication and ciphering.

At stage 8, MME 131 sends an LCS Periodic Location Cancellation request message, including the LDR reference number and optionally the H-GMLC 142 address, to UE 102.

At stage 9, UE 102 stops the periodic and triggered location event reporting and returns an LCS Periodic Location cancellation ack. message to MME 131. Return of an LCS Periodic Location cancellation ack. may apply even when UE 102 has no knowledge of the location procedure being cancelled (e.g., if UE 102 was powered off during the procedure). The LCS Periodic Location Cancellation request at stage 8 and the LCS Periodic Location cancellation ack. message at stage 9 may be as defined for in 3GPP TS 24.080.

At stage 10, MME 131 sends the cancellation acknowledgement to V-GMLC 132 (e.g. in a Provide Subscriber Location Ack. message), and optionally with the LDR reference number and the H-GMLC 142 address. In an aspect, if MME 131 was unable to perform stages 7-9 (e.g. due to a change of MME 131 or VPLMN by UE 102 or because the periodic and triggered MT-LR was never activated in UE 102 by MME 131 at stages 8-11 in signaling flow 200), MME 131 may return an error response (e.g. a Provide Subscriber Location error response message) with a suitable error cause. In this aspect, V-GMLC 132 then returns the error to H-GMLC 142 which may retry the cancellation with a different MME 131 or different PLMN if applicable.

At stage 11, V-GMLC 132 sends an LCS Cancel Service Response message to H-GMLC 142 and optionally with the LDR reference number and the H-GMLC 142 address.

At stage 12, H-GMLC 142 sends an LCS Cancel Service Response message to R-GMLC 152 and optionally with the LDR reference number.

At stage 13, R-GMLC 152 sends an LCS Cancel Service Response to LCS Client 160.

FIG. 4 shows a signaling flow 400 illustrating a procedure for cancelling a periodic and triggered location when cancellation is requested by UE 102. If a network entity (e.g. H-GMLC 142, V-GMLC 132 or MME 131) cancels the periodic and triggered location, the procedure described above for signaling flow 300 may be used to cancel the periodic and triggered location towards UE 102, whereas the procedure for signaling flow 400 may be used to cancel the periodic and triggered location towards LCS Client 160. It is assumed for signaling flow 400 that a periodic and triggered MT-LR was successfully started for UE 102 as described for signaling flow 200 and that stages 1-11 and possibly some occurrences of stages 12-24 of signaling flow 200 have been already successfully performed.

At stage 1 in signaling flow 400, UE 102 waits until UE 102 is registered or can register (e.g. via RAN 120) with a PLMN in the optional list of reporting PLMNs received at stage 9 of signaling flow 200 or with the original serving PLMN for signaling flow 200 (e.g. VPLMN EPC 130) if no optional list of reporting PLMNs was provided to UE 102 or if UE 102 does not support the optional list of reporting PLMNs. If UE 102 is in idle state (e.g. ECM-IDLE state), UE 102 may perform a UE triggered service request or connection resume (e.g. as defined in 3GPP TS 23.401) in order to obtain a signaling connection to a serving MME 131. It is noted that the serving MME 131, RAN 120 and V-GMLC 132 shown in FIG. 4 may be different to the MME 131, RAN 120 and V-GMLC 132 used to establish the periodic and triggered location at stages 1-11 in signaling flow 200.

At stage 2, the UE 102 sends an LCS MO-LR Invoke message to serving MME 131 for cancellation of a deferred MT-LR for periodic and triggered location. This message includes a termination cause (e.g. indicating that a subscriber terminates the procedure) and the H-GMLC 142 address and the LDR Reference Number received by UE 102 at stage 9 in signaling flow 200.

At stage 3, the cancellation request may be sent from MME 131 to a V-GMLC 132 and may include the H-GMLC 142 address, the LDR reference number and an identity (e.g. IMSI or MSISDN) of UE 102. V-GMLC 132 may be determined by MME 131—e.g. based on configuration information in MME 131.

At stages 4-6, the cancellation request may be transferred to H-GMLC 142, R-GMLC 152 serving LCS Client 160 and finally to LCS Client 160.

At stages 7-10, the response from LCS Client 160 is transferred back to MME 131 to acknowledge the cancellation.

At stage 11, MME 131 returns the acknowledgment to UE 102 in an LCS MO-LR Return Result message. The LCS MO-LR Invoke message sent at stage 2 and the LCS MO-LR Return Result message sent at stage 11 may be as defined in 3GPP TS 24.080.

The preceding examples of initiating a periodic and triggered location request for UE 102 in signaling flow 200 and cancelling an ongoing periodic and triggered location request for UE 102 in signaling flows 300 and 400 are based on the exemplary system architecture 100 of FIG. 1, in which RAN 120 and RAN 126 both provide wireless access to UE 102 using an NB-IoT or LTE RAT and in which VPLMN EPC 130 and VPLMN EPC 134 both support E-UTRAN access for UE 102 using RAN 120 and RAN 126, respectively. However, signaling flows similar to or identical to signaling flows 200, 300 and 400 may be possible for other RATs and other networks. In one example embodiment, RAN 120 and RAN 126 in FIG. 1 may each be replaced by a Next Generation RAN (NG-RAN) that provides wireless access to UE 102 according to NR or 5G. In this embodiment, VPLMN EPC 130 and VPLMN EPC 134 may each be replaced by a 5G Core Network (5GC) in which an Access and Mobility Management Function (AMF) may replace each of MMEs 131, 131# and 135, a Location Management Function (LMF) may replace each of E-SMLCs 133, 133# and 136 and V-GMLCs 132, 132# and 137 may remain non-replaced or may be replaced by like named entities that perform similar functions. Signaling flows similar to or almost identical to signaling flows 200, 300 and 400 may then be created by replacing each reference to an MME 131, 131# or 135 in these signaling flows with a reference to an AMF, replacing each reference to an E-SMLC 133, 133# or 136 with a reference to an LMF and replacing each reference to an eNB (e.g. eNB 122 or 124) with a reference to a gNB. Signaling flows similar to signaling flows 200, 300 and 400 may also be created by replacing each reference to an MME 131, 131# or 135 in these signaling flows with a reference to an LMF, replacing each reference to an E-SMLC 133, 133# or 136 with a reference to an LMF (which may be the same LMF that replaces an MME), removing stages 15 and 17 in signaling flow 200 (to enable an LMF to perform some functions described for an MME in signaling flow 200) and replacing each reference to an eNB (e.g. eNB 122 or 124) with a reference to a gNB. The modified signaling flows may define a procedure for performing a periodic and triggered location for UE 102 when UE has wireless access using NR rather than using NB-IoT or LTE.

Figure 5:
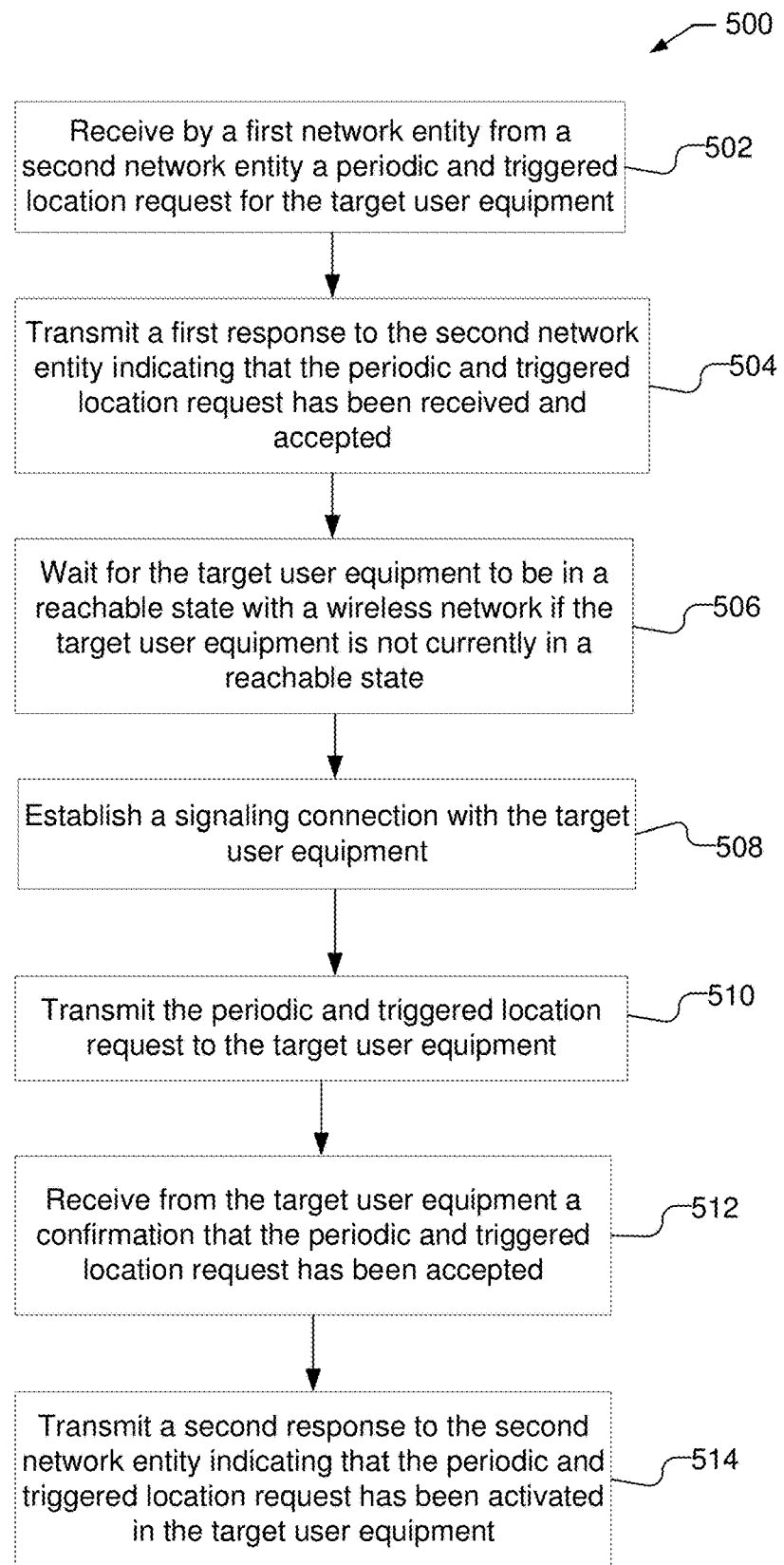
FIGS. 5, 6 and 7 show process flows illustrating methods of performing a periodic and triggered location service according to different embodiments.

FIG. 5 shows a process flow 500 illustrating a method of performing a periodic and triggered location service for a target user equipment (e.g. UE 102). The process flow 500 may be performed by a first network entity. The first network entity may be any of an MME (e.g. MME 131, MME 131# or MME 135 in system architecture 100), an AMF, or an LMF. In the description of process flow 500 below, references to actions performed by an AMF or LMF may correspond to one or more stages in signaling flow 200 modified as described above for applicability to UE 102 NR wireless access via an NG-RAN to a 5GC.

The process flow 500 may start at block 502 where the first network entity receives from a second network entity a periodic and triggered location request for the target user equipment (e.g., UE 102). The second network entity may be a Gateway Mobile Location Center (GMLC). For example, the second network entity may be a V-GMLC (e.g. V-GMLC 132) or an H-GMLC (e.g. H-GMLC 142) and block 502 may correspond to stage 3 in signaling flow 200. The periodic and triggered location request, for example, may correspond to a Provide Subscriber Location request message.

At block 504, the first network entity transmits a first response to the second network entity indicating that the periodic and triggered location request has been received and accepted. The first response, for example, may correspond to a Provide Subscriber Location Acknowledgment message and block 504 may correspond to stage 4 in signaling flow 200.

At block 506, the first network entity waits for the target user equipment to be in a reachable state with a wireless network (e.g. VPLMN EPC 130 and RAN 120) if the target user equipment is not currently in a reachable state. For example, block 506 may correspond to part of stage 8 in signaling flow 200.

At block 508, the first network entity establishes a signaling connection with the target user equipment. The signaling connection may be established with the target user equipment using a Narrowband Internet of Things (NB-IoT) radio access type (RAT), a Long Term Evolution (LTE) RAT, or a New Radio (NR) RAT. Block 508 may correspond to part of stage 8 in signaling flow 200.

At block 510, the first network entity transmits the periodic and triggered location request to the target user equipment. The periodic and triggered location request transmitted to the target user equipment at block 510 may comprise a type of location reporting event and at least one of a maximum reporting interval, a minimum reporting interval and a maximum event sampling interval as described for stage 9 of signaling flow 200. The type of location reporting event may further comprise at least one of entering into an area, leaving from an area, being inside an area, periodic reporting or motion event reporting, as described for stage 9 of signaling flow 200. Block 510 may correspond to stage 9 in signaling flow 200.

At block 512, the first network entity receives from the target user equipment a confirmation indicating that the periodic and triggered location request has been accepted by the target user equipment. Block 512 may correspond to stage 10 in signaling flow 200.

At block 514, the first network entity transmits a second response to the second network entity indicating that the periodic and triggered location request has been activated in the target user equipment. The second response, for example, may be a Subscriber Location Report and block 514 may correspond to part of stage 11 in signaling flow 200.

The first network entity may subsequently receive a location report from the target user equipment to report the detection of an event and optionally to provide a location estimate, for example as at stage 14 in signaling flow 200. The first network entity may then obtain a location estimate for the target user equipment (e.g. from E-SMLC 133 as at stages 15-17 in signaling flow 200). The first network entity may also transmit the location report to the second network entity and include any location estimate obtained.

The first network entity may subsequently receive a location report from the target user equipment when no location reporting event is detected by the target user equipment during the maximum reporting interval, e.g. as described for stages 12-14 of signaling flow 200. The first network entity may then transmit the location report to the second network entity. The location report may indicate (e.g. to an LCS Client such as LCS Client 160 and/or to the second network entity) that the periodic and triggered location is still active in the target user equipment.

In an aspect, the first response transmitted at block 504 may include an indication of an expected time interval or a maximum time interval until the target user equipment next becomes reachable, e.g. if the target user equipment is currently not reachable from the first network entity. For example, the expected time interval or maximum time interval may indicate to an external client (e.g. LCS client 160) how long the external client should expect to wait until the periodic and triggered location request is indicated as activated in the target user equipment at block 514. In an aspect, the first response transmitted at block 504 may also or instead include a last known location for the target user equipment, e.g. if available at the first network entity.

Figure 6:
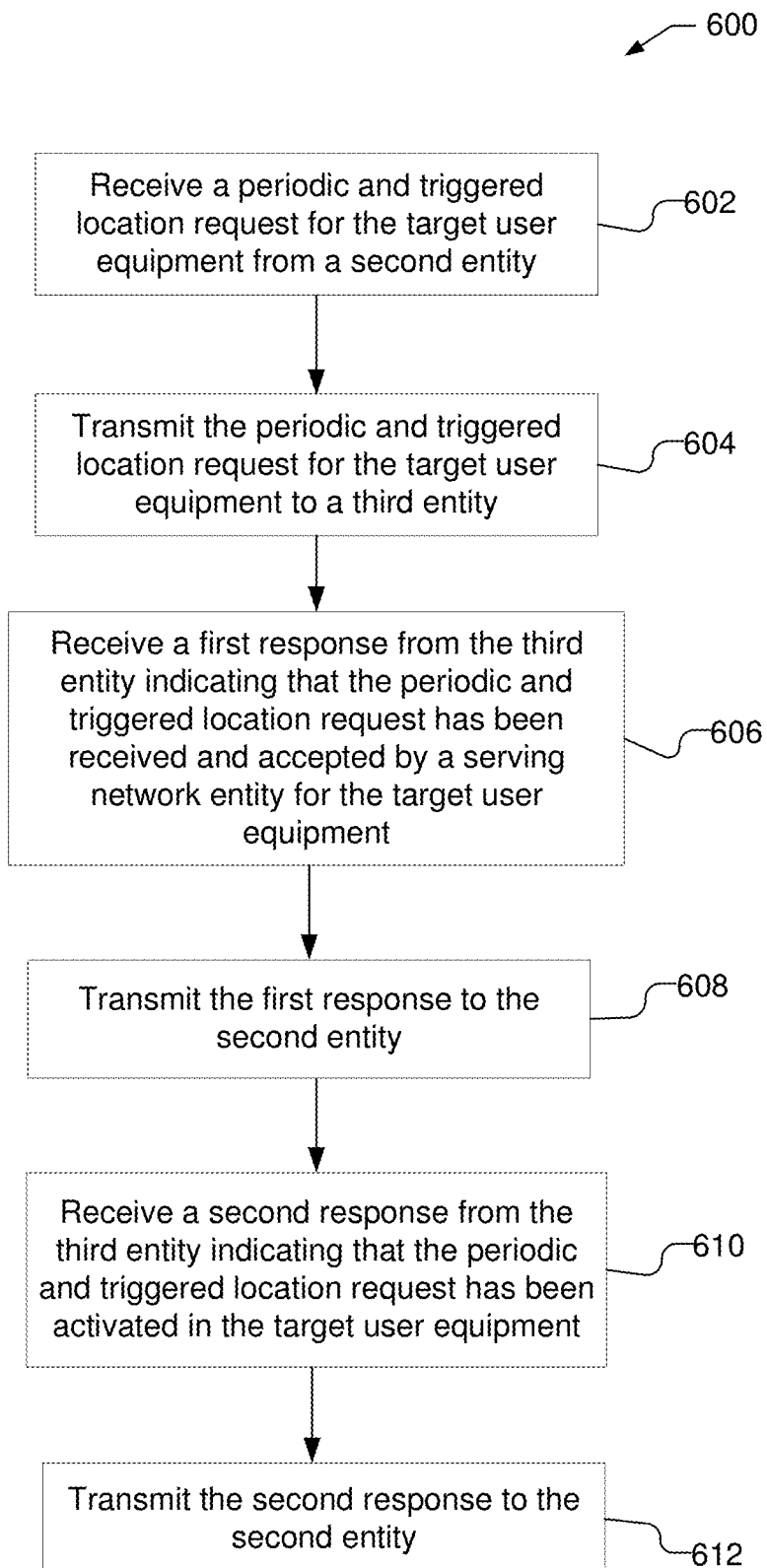

FIG. 6 shows a process flow 600 illustrating another method of performing a periodic and triggered location service for a target user equipment (e.g. UE 102) at a first entity. The first entity, which performs process flow 600, may be an LCS Client (e.g. LCS Client 160 in system architecture 100) or a GMLC such as an R-GMLC (e.g. R-GMLC 152), H-GMLC (e.g. H-GMLC 142) or V-GMLC (e.g. V-GMLC 132).

The process flow 600 may start at block 602 where the first entity receives from a second entity a periodic and triggered location request for the target user equipment (e.g., UE 102). The second entity may be a GMLC, an LCS Client, or a user. For example, if the first entity is an R-GMLC (e.g. R-GMLC 152) or an H-GMLC (e.g. H-GMLC 142), the second entity may be an LCS Client (e.g. LCS Client 160) and block 602 may correspond to stage 1 in signaling flow 200. If the first entity is an H-GMLC (e.g. H-GMLC 142) or a V-GMLC (e.g. V-GMLC 132), the second entity may be an R-GMLC (e.g. R-GMLC 152) or an H-GMLC (e.g. H-GMLC 142), in each case, respectively, and block 602 may correspond to part of stage 2 in signaling flow 200. If the first entity is an LCS Client (e.g. LCS Client 160), the second entity may be a user of the LCS Client.

At block 604, the first entity transmits the periodic and triggered location request for the target user equipment received at block 602 to a third entity. If the first entity is an LCS Client (e.g. LCS Client 160), the third entity may be a GMLC such as an R-GMLC (e.g. R-GMLC 152) or an H-GMLC (e.g. H-GMLC 142) and block 604 may then correspond to stage 1 in signaling flow 200. If the first entity is an R-GMLC (e.g. R-GMLC 152) or an H-GMLC (e.g. H-GMLC 142), the third entity may be an H-GMLC (e.g. H-GMLC 142) or a V-GMLC (e.g. V-GMLC 132) in each case, respectively, and block 604 may correspond to part of stage 2 in signaling flow 200. If the first entity is a V-GMLC (e.g. V-GMLC 132), the third entity may be an MME (e.g. MME 131), an AMF or an LMF, and block 604 may correspond to stage 3 in signaling flow 200.

At block 606, the first entity receives a first response from the third entity indicating that the periodic and triggered location request has been received and accepted by serving network entity for the target user equipment. The first response, for example, may confirm the capability and intent to support the request, but may not confirm that location reporting was activated in the target user equipment or that the target user equipment will necessarily be able to support the request. The serving network entity may be an MME (e.g. MME 131 in signaling flow 200), an AMF or an LMF. If the first entity is an LCS Client (e.g. LCS Client 160), block 606 may correspond to stage 7 in signaling flow 200. If the first entity is an R-GMLC (e.g. R-GMLC 152), block 606 may correspond to stage 6 in signaling flow 200. If the first entity is an H-GMLC (e.g. H-GMLC 142), block 606 may correspond to stage 5 in signaling flow 200. If the first entity is a V-GMLC (e.g. V-GMLC 132), block 606 may correspond to stage 4 in signaling flow 200.

At block 608, the first entity transmits the first response to the second entity. For example, if the first entity is an R-GMLC (e.g. R-GMLC 152), block 608 may correspond to stage 7 in signaling flow 200. If the first entity is an H-GMLC (e.g. H-GMLC 142), block 608 may correspond to stage 6 in signaling flow 200. If the first entity is a V-GMLC (e.g. V-GMLC 132), block 608 may correspond to stage 5 in signaling flow 200.

At block 610, the first entity receives a second response from the third entity indicating that the periodic and triggered location request has been activated in the target user equipment. The second response, for example, may confirm that the event reporting has started in the target user equipment. Block 610 may correspond to part of stage 11 in signaling flow 200.

At block 612, first entity transmits the second response to the second entity. For example, block 612 may correspond to part of stage 11 in signaling flow 200.

As discussed above, the target user equipment may be accessed from the serving network entity using a Narrowband Internet of Things (NB-IoT) radio access type (RAT), a Long Term Evolution (LTE) RAT, or a New Radio (NR) RAT. The periodic and triggered location request received at block 602 may comprise a type of location reporting event and at least one of a maximum reporting interval, a minimum reporting interval and a maximum event sampling interval as described for stage 1 of signaling flow 200. The type of location reporting event may further comprise at least one of entering into an area, leaving from an area, being inside an area, periodic reporting or motion event reporting, as described for stage 1 of signaling flow 200.

As also discussed above, the second response may be received from the third entity at block 610 after a delay caused by the target user equipment not being reachable from the serving network entity, where the serving network entity waits for the target user equipment to become reachable, e.g. as described for stage 8 of signaling flow 200.

The first entity may subsequently receive a location report from the third entity to report the detection of an event by the target user equipment which may include a location estimate, for example as at stage 19, 21, 23 or 24 in signaling flow 200. The first entity may then forward the location report to the second entity and including any location estimate.

The first entity may also or instead subsequently receive a location report from the third entity when no location reporting event is detected by the target user equipment during the maximum reporting interval, e.g. as described for stages 12-14 of signaling flow 200. The first entity may then transmit the location report to the second network entity. If the first entity does not receive any location report from the third entity over an interval longer than the maximum reporting interval, the first entity may transmit an error report to the second entity indicating that the periodic and triggered location request may no longer be active in the target user equipment. The first entity may also cancel the periodic and triggered location request procedure by sending a cancellation message to the second entity and/or to the third entity, e.g. as described in signaling flows 300 and 400.

Figure 7:
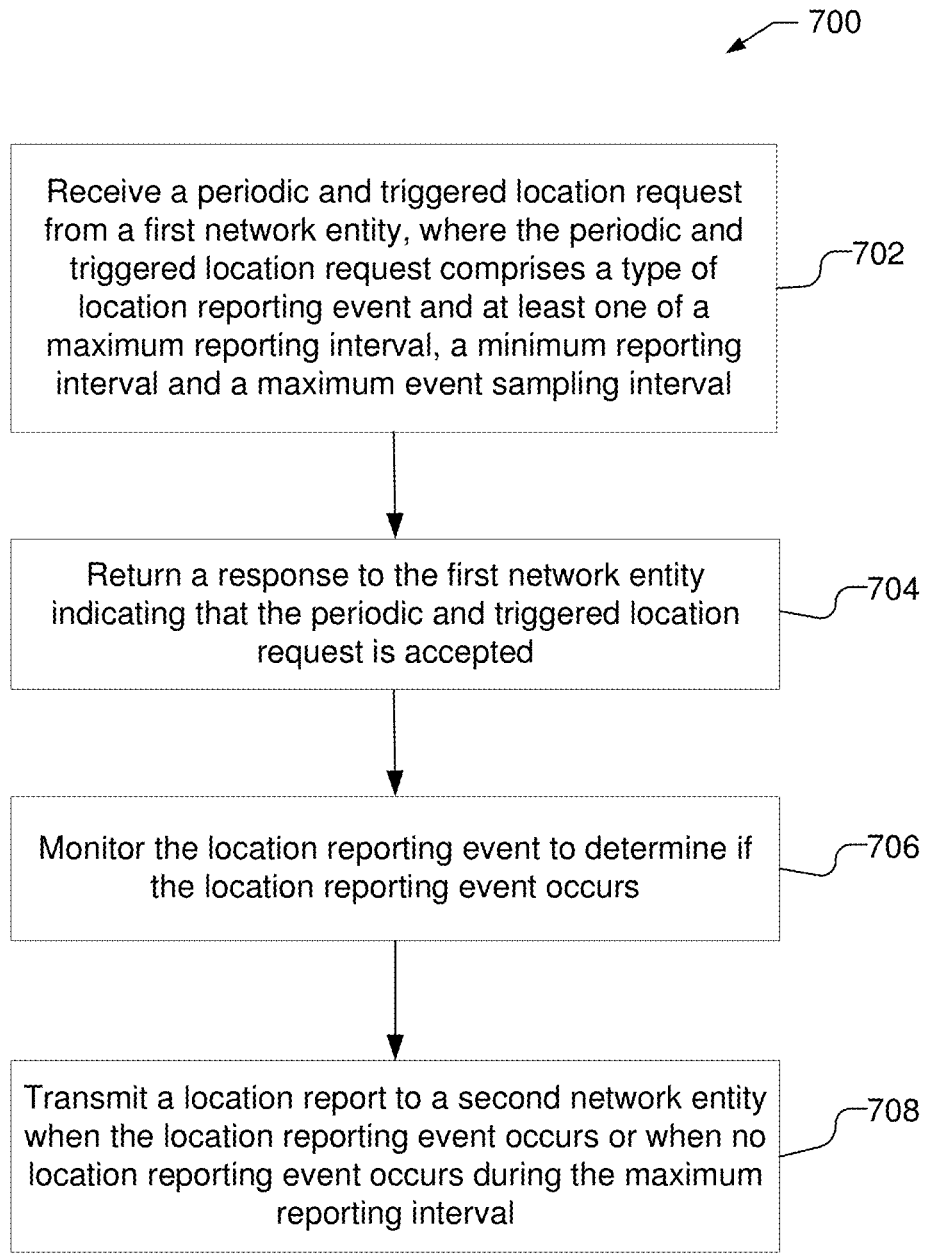

FIG. 7 shows a process flow 700 illustrating a method of instigating and performing a periodic and triggered location request at a user equipment (e.g. UE 102). The user equipment, for example, may support NB-IoT radio access, LTE radio access and/or NR radio access.

The process flow 700 may start at block 702 where the user equipment receives a periodic and triggered location request from a first network entity. The periodic and triggered location request may comprise a type of location reporting event and at least one of a maximum reporting interval, a minimum reporting interval and a maximum event sampling interval. In an aspect, the type of location reporting event may comprise at least one of entering into an area, leaving from an area, being inside an area, periodic reporting or motion event reporting. Block 702 may correspond to stage 9 in signaling flow 200.

At block 704, the user equipment returns a response to the first network entity indicating that the periodic and triggered location request is accepted. Block 704 may correspond to stage 10 in signaling flow 200.

At block 706, the user equipment monitors the location reporting event to determine if the location reporting event occurs. In an aspect, monitoring the location reporting event at block 706 to determine if the location reporting event occurs may comprise monitoring the location reporting event at an interval no greater than the maximum event sampling interval received at block 702. Block 706 may correspond to stage 12 of signaling flow 200.

At block 708, the user equipment transmits a location report to a second network entity when the location reporting event occurs or when no location reporting event occurs during the maximum reporting interval. Block 708 may correspond to block 14 in signaling flow 200.

In an aspect, the periodic and triggered location request is received at block 702 and the location report is transmitted at block 708 using a Narrowband Internet of Things (NB-IoT) radio access type (RAT), a Long Term Evolution (LTE) RAT, or a New Radio (NR) RAT.

In an aspect, the first network entity and the second network entity are each a Mobility Management Entity (MME), an Access and Mobility Management Function (AMF), or a Location Management Function (LMF). In an aspect, the first network entity is the same as the second network entity. In another aspect, the first network entity is different to the second network entity. In this other aspect, the first network entity and the second network entity may belong to different networks.

In an aspect, transmitting the location report to the second network entity at block 708 comprises transmitting the location report to the second network entity when the location reporting event occurs following an interval at least equal to the minimum reporting interval since a transmission of a previous location report.

Figure 8:
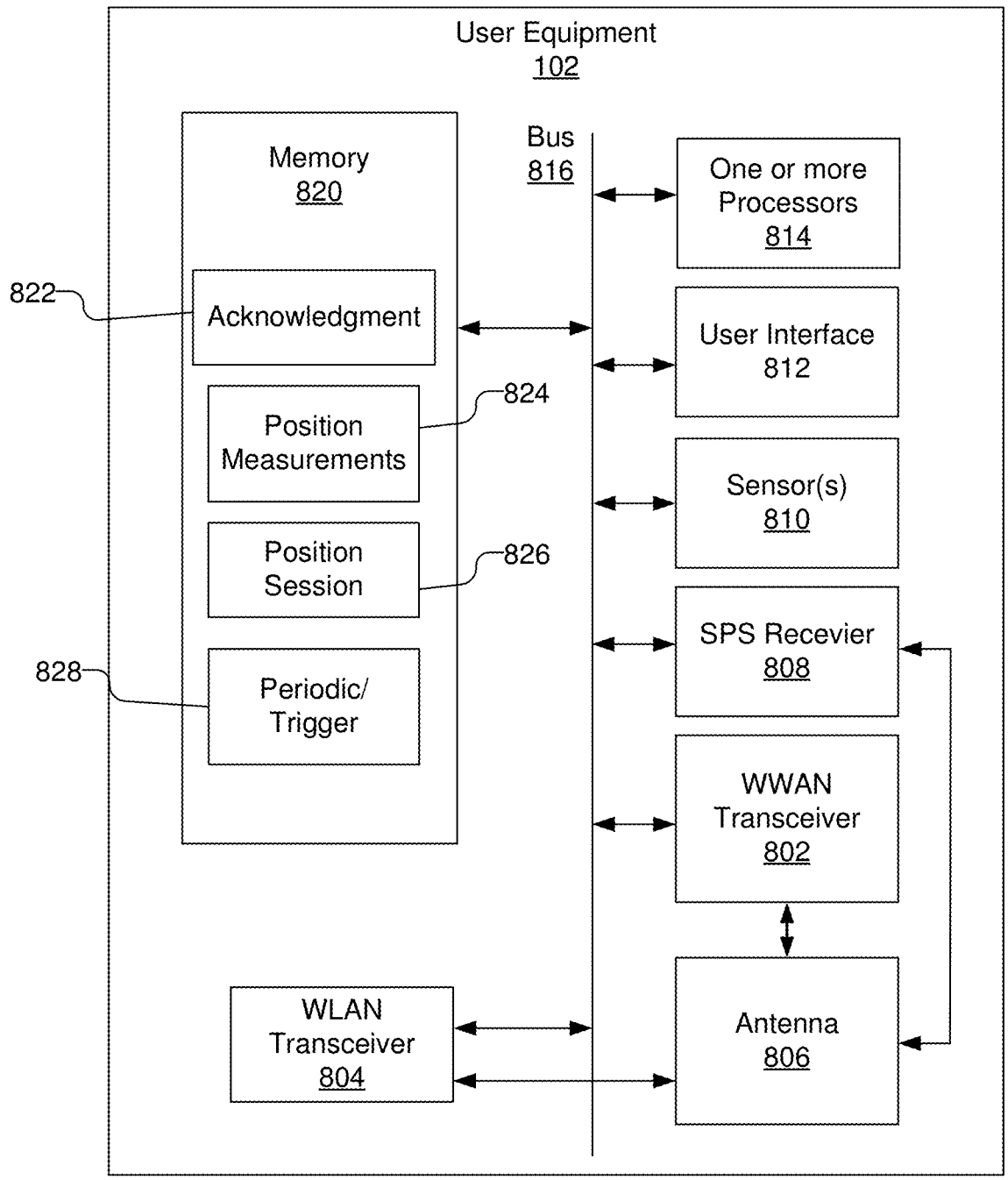
FIG. 8 is a block diagram of an embodiment of a mobile device or UE.

FIG. 8 is a diagram illustrating an example of a hardware implementation of UE 102. The UE 102 may include a Wireless Wide Area Network (WWAN) transceiver 802 to wirelessly communicate with, e.g., cellular transceivers such as eNB 122 (shown in FIG. 1). The UE 102 may also include a WLAN transceiver 804 to wirelessly communicate with local transceivers. The UE 102 may further include an SPS receiver 808 for receiving SPS signals and data from SPS system 110 (shown in FIG. 1). The UE 102 may include one or more antennas 806 that may be used with the WWAN transceiver 802, WLAN transceiver 804 and/or SPS receiver 808. The UE 102 may include one or more sensors 810, such as cameras, accelerometers, gyroscopes, electronic compass, magnetometer, barometer, etc. The UE 102 may further include a user interface 812 that may include e.g., a display, a keypad or other input device, such as virtual keypad on the display, through which a user may interface with the UE 102.

The UE 102 further includes one or more processors 814 and memory 820, which may be coupled together with bus 816. The one or more processors 814 and other components of the UE 102 may similarly be coupled together with bus 816, a separate bus, or may be directly connected together or a combination of the foregoing. The memory 820 may contain executable code or software instructions that when executed by the one or more processors 814 cause the one or more processors to operate as a special purpose computer programmed to perform the techniques disclosed herein.

As illustrated in FIG. 8, the memory 820 includes one or more components or modules that when implemented by the one or more processors 814 implements the methodologies as described herein. While the components or modules are illustrated as software in memory 820 that is executable by the one or more processors 814, it should be understood that the components or modules may be dedicated hardware either in the processor or off processor. As illustrated, the memory 820 may include an acknowledgement unit 822 that when implemented by the one or more processors 814 causes the one or more processors 814 to transmit an acknowledgment that the periodic and triggered location request has been activated in the UE 102, e.g., through the WWAN transceiver 802, after the periodic and triggered location request has been received.

The memory 820 may further include a position measurements unit 824 that when implemented by the one or more processors 814 causes the one or more processors 814 to obtain position measurements, e.g., using one or more of the WWAN transceiver 802, WLAN transceiver 804 and/or SPS Receiver 808. For example, the position measurements may include at least one of cell ID, received signal strength indicator (RSSI), round trip signal propagation time (RTT), RSTD or pseudorange measurements.

The memory 820 may further include a position session unit 826 that when implemented by the one or more processors 814 causes the one or more processors 814 to engage in a positioning session with a location server (e.g. E-SMLC 133), e.g., upon request from the location server or initiated by the UE 102, once the UE 102 enters a connected state with a wireless network.

The memory 820 may further include a periodic/trigger unit 828. The periodic/trigger unit 828 when implemented by the one or more processors 814 may cause the one or more processors 814 to monitor periodic and/or trigger event parameters, e.g., received in a periodic and triggered location request. The trigger event parameters may include, e.g., a maximum event sampling interval, a maximum reporting interval, a minimum reporting interval, and one or more location triggers. For example, the location triggers may comprise at least one of leaving a target area, entering a target area, remaining within a target area or a threshold linear distance for a motion event. The periodic/trigger unit 828 may evaluate the one or more location triggers periodically at an interval equal to or less than the maximum event sampling interval and may also track the maximum reporting interval. The periodic/trigger unit 828 when implemented by the one or more processors 814 may cause the one or more processors 814 to re-enter a connected state with a wireless network when a trigger condition occurs, when a periodic reporting interval expires or when the maximum reporting interval expires and send a report to the wireless network (e.g. to an MME, AMF or LMF in the wireless network) to report the event.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Thus, a user equipment for performing periodic and triggered location may include a means for receiving a periodic and triggered location request from a first network entity, the periodic and triggered location request comprising a type of location reporting event and at least one of a maximum reporting interval, a minimum reporting interval and a maximum event sampling interval, which may be, e.g., the WWAN transceiver 802 as well as the one or more processors 814. The type of location reporting event may comprise at least one of entering into an area, leaving from an area, being inside an area, periodic reporting or motion event reporting. A means for returning a response to the first network entity indicating that the periodic and triggered location request is accepted may be, e.g., the WWAN transceiver 802 as well as the acknowledgement unit 822 which may be implemented by the one or more processors 814. A means for monitoring a location reporting event to determine if the location reporting event occurs may be, e.g., the periodic/trigger unit 828 which may be implemented by the one or more processors 814. The location reporting event may be monitored at an interval no greater than the maximum event sampling interval. A means for transmitting a location report to a second network entity when the location reporting event occurs or when no location reporting event occurs during the maximum reporting interval may be, e.g., the WWAN transceiver 802 as well as the periodic/trigger unit 828 which may be implemented by the one or more processors 814. The location report may be transmitted to the second network entity when the location reporting event occurs following an interval at least equal to the minimum reporting interval since a transmission of a previous location report. The periodic and triggered location request may be received and the location report may be transmitted using a Narrowband Internet of Things (NB-IoT) radio access type (RAT), a Long Term Evolution (LTE) RAT, or a New Radio (NR) RAT. The first network entity and the second network entity may be each a Mobility Management Entity (MME), an Access and Mobility Management Function (AMF), or a Location Management Function (LMF). For example, the first network entity may be the same as the second network entity or different to the second network entity. Moreover, the first network entity and the second network entity may belong to different networks. The type of location reporting event may comprise at least one of entering into an area, leaving from an area, being inside an area, periodic reporting or motion event reporting.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 820, and are configured to cause the one or more processors to operate as a special purpose computer programmed to perform the algorithms disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 9:
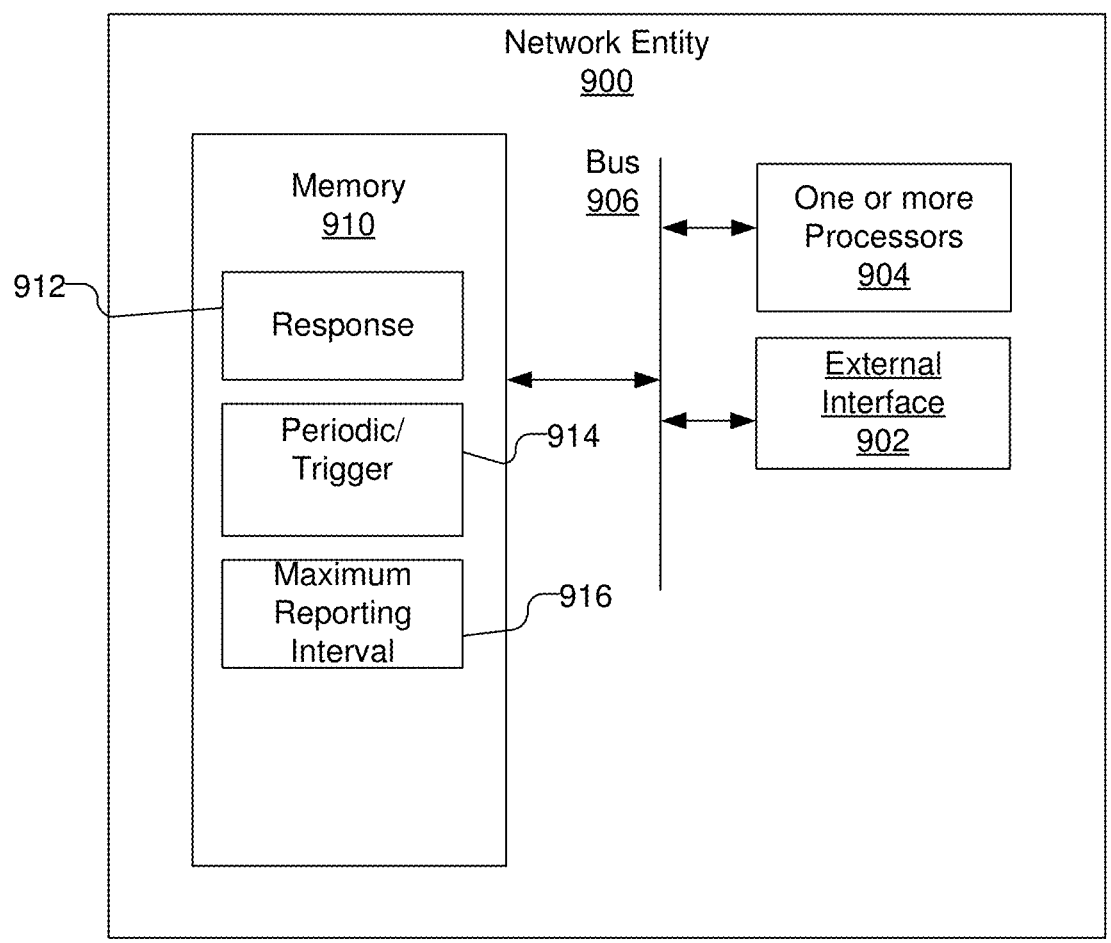
FIG. 9 is a block diagram of an embodiment of a network entity such as an MME, E-SMLC or GMLC.

FIG. 9 is a diagram illustrating an example of a hardware implementation of a network entity 900, such as the MME 131, E-SMLC 133, V-GMLC 132, H-GMLC 142, R-GMLC 152, eNB 122 or an AMF or LMF. The network entity 900 includes, e.g., hardware components such as an external interface 902, which may be a wired and/or wireless interface capable of connecting to UE 102 and/or to other network entities and/or to an LCS Client. The network entity 900 includes one or more processors 904 and memory 910, which may be coupled together with bus 906. The memory 910 may contain executable code or software instructions that when executed by the one or more processors 904 cause the one or more processors to operate as a special purpose computer programmed to perform the techniques disclosed herein.

As illustrated in FIG. 9, the memory 910 includes one or more components or modules that when implemented by the one or more processors 904 implement the methodologies as described herein. While the components or modules are illustrated as software in memory 910 that is executable by the one or more processors 904, it should be understood that the components or modules may be dedicated hardware either in the processor or off processor. As illustrated, the memory 910 may include a response unit 912 that when implemented by the one or more processors 904 causes the one or more processors 904 to provide a first response to an LCS client or to another network entity indicating that a request for periodic and triggered location reporting has been accepted by a serving network entity for a target UE (e.g. an MME, AMF or LMF) and the serving network entity is ready to initiate the procedure in the target UE. The response unit 912 when implemented by the one or more processors 904 causes the one or more processors 904 to monitor a response from the target UE or from another network entity indicating that a periodic and triggered location request has been activated in the target UE, which may be returned soon after the first response for the target UE or may be returned several hours or days after the first response for the target UE, and causes the external interface 902 to provide a second response to an LCS client or another network entity indicating that the target UE will begin to return periodic and triggered location reports.

The memory 910 may include a periodic/trigger unit 914 that when implemented by the one or more processors 904 causes the one or more processors 904 to communicate, e.g., via the external interface 902, with a target UE or another network entity to request a periodic and trigger location session, or receive a request for a location session. The periodic/trigger unit 914 may define a maximum event sampling interval, a maximum reporting interval, a minimum reporting interval and/or one or more location trigger events or a periodic reporting period and may cause the external interface 902 to provide the periodic and triggered location parameters to the target UE or to another network entity in a periodic and triggered location request after receiving a request for periodic and triggered location reporting from an LCS Client or another nework entity (e.g. a GMLC). The periodic/trigger unit 914 may cause the external interface 902 to provide the periodic and triggered location parameters to the target UE after waiting for the target UE to become reachable and to be connected to a wireless network.

The memory 910 may also include a maximum reporting interval unit 916 that when implemented by the one or more processors 904 causes the one or more processors 904 to monitor location reports from a target UE (e.g. received from the target UE directly or received via another network element such as an MME, AMF, LMF or GMLC) within the maximum reporting interval. If a location report is received, the maximum reporting interval unit 916 may confirm that location reporting is still active in the UE 102. On the other hand, if no location report is received following the maximum reporting interval, the maximum reporting interval unit 916 may determine that the periodic and triggered location request is no longer active in the target UE and may cause the external interface 902 to provide an indication to the LCS client or network (e.g. GMLC) that location reporting was terminated in the UE 102 and/or may instigate cancellation of the periodic and triggered location.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 820 or 910, and are configured to cause the one or more processors to operate as a special purpose computer programmed to perform the algorithms disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a first network entity for performing periodic and triggered location for a target user equipment may include means for receiving from a second network entity a periodic and triggered location request for the target user equipment, which may be, e.g., the external interface 902 as well as the one or more processors 904. The first network entity may be, e.g., a Mobility Management Entity (MME), an Access and Mobility Management Function (AMF), or a Location Management Function (LMF). The second network entity may be a Gateway Mobile Location Center (GMLC). The first network entity may include a means for transmitting a first response to the second network entity indicating that the periodic and triggered location request has been received and accepted, which may be, e.g., the external interface 902 as well as the response unit 912 which may be implemented by the one or more processors 904. The first response may comprise an indication of an expected time interval or a maximum time interval until the target user equipment next becomes reachable. The first response may comprise a last known location for the target user equipment. A means for waiting for the target user equipment to be in a reachable state with a wireless network if the target user equipment is not currently in a reachable state may be, e.g., the response unit 912 which may be implemented by the one or more processors 904. A means for establishing a signaling connection with the target user equipment may be, e.g., the external interface 902. The signaling connection may be established using a Narrowband Internet of Things (NB-IoT) radio access type (RAT), a Long Term Evolution (LTE) RAT, or a New Radio (NR) RAT. A means for transmitting the periodic and triggered location request to the target user equipment may be, e.g., the external interface 902 as well as the periodic/trigger unit 914 which may be implemented by the one or more processors 904. A means for receiving from the target user equipment a confirmation indicating that the periodic and triggered location request has been accepted may be, e.g., the external interface 902 as well as the response unit 912 which may be implemented by the one or more processors 904. A means for transmitting a second response to the second network entity indicating that the periodic and triggered location request has been activated in the target user equipment may be, e.g., the external interface 902 as well as the response unit 912 which may be implemented by the one or more processors 904. The periodic and triggered location request transmitted to the target user equipment may comprise a type of location reporting event and at least one of a maximum reporting interval, a minimum reporting interval and a maximum event sampling interval. The type of location reporting event may comprise at least one of entering into an area, leaving from an area, being inside an area, periodic reporting or motion event reporting. The periodic and triggered location request transmitted to the target user equipment may comprise the maximum reporting interval and the first network entity may further include a means for receiving a location report from the target user equipment when no location reporting event is detected by the target user equipment during the maximum reporting interval, which may be, e.g., the external interface 902 as well as the response unit 912 which may be implemented by the one or more processors 904, and a means for transmitting the location report to the second network entity, which may be, e.g., the external interface 902 as well as the response unit 912 which may be implemented by the one or more processors 904.

Figure 10:
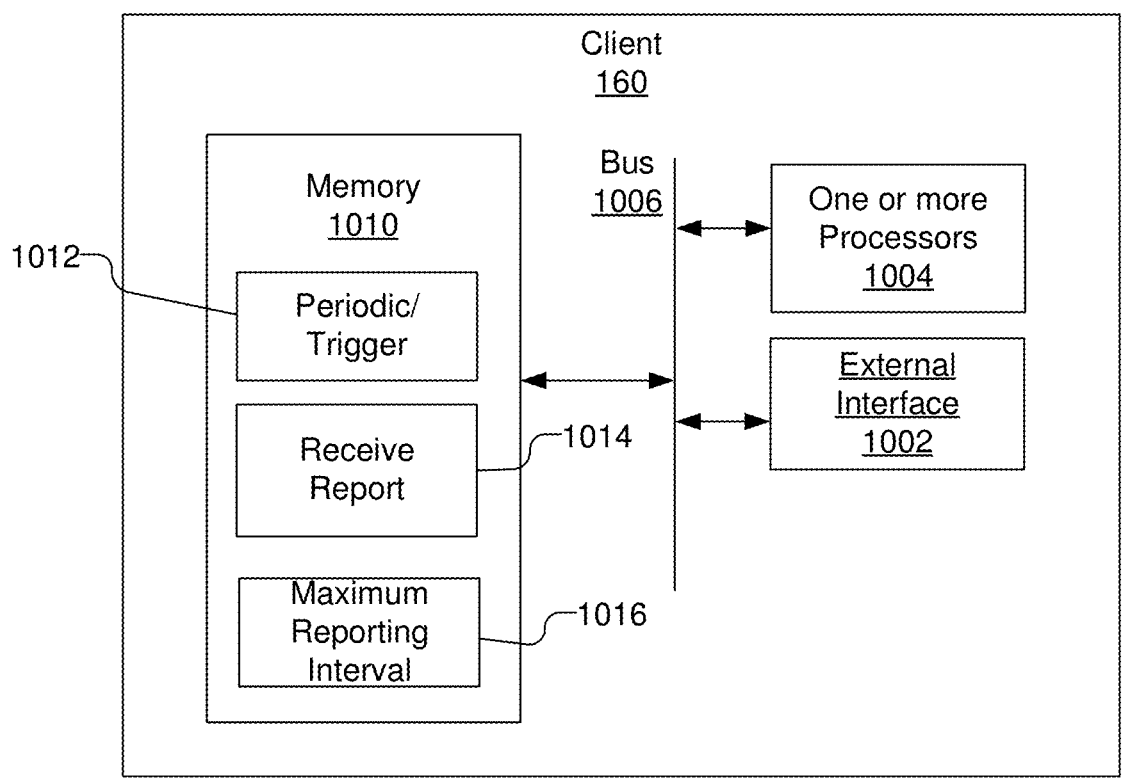
FIG. 10 is a block diagram of an embodiment of an external client.

FIG. 10 is a diagram illustrating an example of a hardware implementation of an external (LCS) client 160. The client 160 includes, e.g., hardware components such as an external interface 1002, which may be a wired or wireless interface capable of connecting to a network entity, such as the R-GMLC 152. The client 160 includes one or more processors 1004 and memory 1010, which may be coupled together with bus 1006. The memory 1010 may contain executable code or software instructions that when executed by the one or more processors 1004 cause the one or more processors to operate as a special purpose computer programmed to perform the techniques disclosed herein.

As illustrated in FIG. 10, the memory 1010 includes one or more components or modules that when implemented by the one or more processors 1004 implements the methodologies as described herein. While the components or modules are illustrated as software in memory 1010 that is executable by the one or more processors 1004, it should be understood that the components or modules may be dedicated hardware either in the processor or off processor. As illustrated, the memory 1010 may include a periodic/trigger unit 1012 that when implemented by the one or more processors 1004 causes the one or more processors 1004 to communicate, e.g., via the external interface 1002, with the network to request a periodic and triggered location service with a target user equipment. The periodic/trigger unit 1012 may define a maximum event sampling interval, a maximum reporting interval, a minimum reporting interval and one or more location event triggers or a periodic reporting period and cause the external interface 1002 to provide the periodic and triggered location parameters for the target UE in a periodic and triggered location request sent to a network entity such as an R-GMLC.

The memory 1010 may also include a receive report unit 1014 that when implemented by the one or more processors 1004 causes the one or more processors 1004 to receive a first response from a network entity (e.g. an R-GMLC) indicating that an LCS client request for periodic and triggered location reporting has been accepted by the network and the network (e.g. an MME, AMF or LMF) is ready to initiate the procedure in the target UE. The receive report unit 1014 when implemented by the one or more processors 1004 causes the one or more processors 1004 to also receive a second response from the network entity indicating that the periodic and triggered location request has been activated in the target UE, which may be returned soon after the first response for a normal UE or might be returned several hours or days after the first response for an IoT UE. The receive report unit 1014 when implemented by the one or more processors 1004 may further cause the one or more processors 1004 to cause the first response and the second response to be transmitted to a network entity, (e.g., a Location Services (LCS) Client or a Gateway Mobile Location Center (GMLC) or a user of the LCS Client 160). The receive report unit 1014 when implemented by the one or more processors 1004 may further cause the one or more processors 1004 to receive location reports for the target user equipment from the network and to cause the location reports to be transmitted to a network entity or to a user of the LCS Client 160.

The memory 1010 may also include a maximum reporting interval unit 1016 that when implemented by the one or more processors 1004 causes the one or more processors 1004 to monitor location reports from the target UE within a maximum reporting interval for a periodic and triggered location request. If a location report is received, the maximum reporting interval unit 1016 may confirm that location reporting is still active in the target UE. On the other hand, if no location report is received following a maximum reporting interval, the maximum reporting interval unit 1016 may determine that the periodic and triggered location request is no longer active in the target UE. The maximum reporting interval unit 1016 may also be configured to receive an indication from a network entity (e.g. an R-GMLC) that a periodic and triggered location request is no longer active in the target UE.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 820 or 1004, and are configured to cause the one or more processors to operate as a special purpose computer programmed to perform the algorithms disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a first entity for performing periodic and triggered location for a target user equipment may include means for receiving a periodic and triggered location request for the target user equipment from a second entity, which may be, e.g., the external interface 1002 as well as the periodic/trigger unit 1012 which may be implemented by the one or more processors 1004. The first entity may be a Location Services (LCS) Client or a Gateway Mobile Location Center (GMLC). The second entity may be a Location Services (LCS) Client or a Gateway Mobile Location Center (GMLC) or a user of the LCS Client. A means for transmitting the periodic and triggered location request for the target user equipment to a third entity may be, e.g., the external interface 1002 as well as the periodic/trigger unit 1012 which may be implemented by the one or more processors 1004. The third entity may be a Gateway Mobile Location Center (GMLC), a Mobility Management Entity (MME), an Access and Mobility Management Function (AMF), or a Location Management Function (LMF). The periodic and triggered location request transmitted to the target user equipment may comprise a type of location reporting event and at least one of a maximum reporting interval, a minimum reporting interval and a maximum event sampling interval, wherein the type of location reporting event may comprise at least one of entering into an area, leaving from an area, being inside an area, periodic reporting or motion event reporting. A means for receiving a first response from the third entity indicating that the periodic and triggered location request has been received and accepted by a serving network entity for the target user equipment may be, e.g., the external interface 1002 as well as the receive report unit 1014 which may be implemented by the one or more processors 1004. A means for transmitting the first response to the second entity may be, e.g., the external interface 1002 as well as the receive report unit 1014 which may be implemented by the one or more processors 1004. A means for receiving a second response from the third entity indicating that the periodic and triggered location request has been activated in the target user equipment may be, e.g., the external interface 1002 as well as the receive report unit 1014 which may be implemented by the one or more processors 1004. A means for transmitting the second response to the second entity may be, e.g., the external interface 1002 as well as the receive report unit 1014 which may be implemented by the one or more processors 1004. The first entity may further include a means for receiving a location report from the third entity to report the detection of an event by the target user equipment, the location report including a location estimate for the target user, which may be, e.g., the external interface 1002 as well as the receive report unit 1014 which may be implemented by the one or more processors 1004, and a means for transmitting the location report to the second entity, the location report including the location estimate for the target user, which may be, e.g., the external interface 1002 as well as the receive report unit 1014 which may be implemented by the one or more processors 1004. The first entity may further include a means for receiving a location report from the third entity when no trigger event is detected by the target user equipment during the maximum reporting interval, which may be, e.g., the external interface 1002 as well as the receive report unit 1014 which may be implemented by the one or more processors 1004, and a means for transmitting the location report to the second entity, which may be, e.g., the external interface 1002 as well as the receive report unit 1014 which may be implemented by the one or more processors 1004. The first entity may further include a means for transmitting an error report to the second entity indicating that the periodic and triggered location request is no longer active in the target user equipment after not receiving any location report from the third entity over an interval longer than the maximum reporting interval, which may be, e.g., the external interface 1002 as well as the maximum reporting interval unit 1014 which may be implemented by the one or more processors 1004. The first entity may further include a means for transmitting a cancellation message to at least one of the second entity and the third entity after not receiving any location report from the third entity over an interval longer than the maximum reporting interval, which may be, e.g., the external interface 1002 as well as the maximum reporting interval unit 1016 which may be implemented by the one or more processors 1004.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method at a first network entity of performing periodic and triggered location for a target user equipment, comprising:
   receiving from a second network entity a periodic and triggered location request for the target user equipment;
   transmitting a first response to the second network entity indicating that the periodic and triggered location request has been received and accepted;
   waiting for the target user equipment to be in a reachable state with a wireless network if the target user equipment is not currently in a reachable state;
   establishing a signaling connection with the target user equipment;
   transmitting the periodic and triggered location request to the target user equipment, wherein the periodic and triggered location request comprises a type of a location reporting event, a maximum reporting interval, and a maximum event sampling interval in which the target user equipment is required to monitor whether the location reporting event has or has not occurred;
   receiving from the target user equipment a confirmation indicating that the periodic and triggered location request has been accepted;

transmitting a second response to the second network entity indicating that the periodic and triggered location request has been activated in the target user equipment; and receiving a location report from the target user equipment when the location reporting event occurs and when no location reporting event occurs during the maximum reporting interval.

2. The method of claim 1, wherein the signaling connection is established using a Narrowband Internet of Things (NB-IoT) radio access type (RAT), a Long Term Evolution (LTE) RAT, or a New Radio (NR) RAT.

3. The method of claim 1, wherein the first network entity is a Mobility Management Entity (MME), an Access and Mobility Management Function (AMF), or a Location Management Function (LMF).

4. The method of claim 3, wherein the second network entity is a Gateway Mobile Location Center (GMLC).

5. The method of claim 1, wherein the type of location reporting event comprises at least one of entering into an area, leaving from an area, being inside an area, periodic reporting or motion event reporting.

6. The method of claim 1, wherein the method further comprises:
transmitting the location report to the second network entity.

7. The method of claim 1, wherein the first response comprises an indication of an expected time interval or a maximum time interval until the target user equipment next becomes reachable.

8. The method of claim 1, wherein the first response comprises a last known location for the target user equipment.

9. A first network entity for performing periodic and triggered location for a target user equipment, comprising:
an external interface configured to communicate with a second network entity and the target user equipment; and
at least one processor configured to receive with the external interface a periodic and triggered location request from the second network entity for the target user equipment, transmit with the external interface a first response to the second network entity indicating that the periodic and triggered location request has been received and accepted, wait for the target user equipment to be in a reachable state with a wireless network if the target user equipment is not currently in a reachable state, establish through the external interface a signaling connection with the target user equipment, transmit with the external interface the periodic and triggered location request to the target user equipment, wherein the periodic and triggered location request comprises a type of a location reporting event, a maximum reporting interval, and a maximum event sampling interval in which the target user equipment is required to monitor whether the location reporting event has or has not occurred, receive with the external interface an acknowledgment from the target user equipment that the periodic and triggered location request has been received, transmit a second response to the second network entity indicating that the periodic and triggered location request has been activated in the target user equipment, and receive a location report from the target user equipment when the location reporting event occurs and when no location reporting event occurs during the maximum reporting interval.

10. The first network entity of claim 9, wherein the signaling connection is established using a Narrowband Internet of Things (NB-IoT) radio access type (RAT), a Long Term Evolution (LTE) RAT, or a New Radio (NR) RAT.

11. The first network entity of claim 9, wherein the first network entity is a Mobility Management Entity (MME), an Access and Mobility Management Function (AMF), or a Location Management Function (LMF).

12. The first network entity of claim 9, wherein the at least one processor is further configured to:
transmit with the external interface the location report to the second network entity.

13. The first network entity of claim 9, wherein the first response comprises an indication of an expected time interval or a maximum time interval until the target user equipment next becomes reachable or a last known location for the target user equipment.

14. A first network entity for performing periodic and triggered location for a target user equipment, comprising:
means for receiving from a second network entity a periodic and triggered location request for the target user equipment;
means for transmitting a first response to the second network entity indicating that the periodic and triggered location request has been received and accepted;
means for waiting for the target user equipment to be in a reachable state with a wireless network if the target user equipment is not currently in a reachable state;
means for establishing a signaling connection with the target user equipment;
means for transmitting the periodic and triggered location request to the target user equipment, wherein the periodic and triggered location request comprises a type of a location reporting event, a maximum reporting interval, and a maximum event sampling interval in which the target user equipment is required to monitor whether the location reporting event has or has not occurred;
means for receiving from the target user equipment a confirmation indicating that the periodic and triggered location request has been accepted;
means for transmitting a second response to the second network entity indicating that the periodic and triggered location request has been activated in the target user equipment; and
means for receiving a location report from the target user equipment when the location reporting event occurs and when no location reporting event occurs during the maximum reporting interval.

15. The first network entity of claim 14, wherein the signaling connection is established using a Narrowband Internet of Things (NB-IoT) radio access type (RAT), a Long Term Evolution (LTE) RAT, or a New Radio (NR) RAT.

16. The first network entity of claim 14, wherein the first network entity is a Mobility Management Entity (MME), an Access and Mobility Management Function (AMF), or a Location Management Function (LMF).

17. The first network entity of claim 16, wherein the second network entity is a Gateway Mobile Location Center (GMLC).

18. The first network entity of claim 14, wherein the type of location reporting event comprises at least one of entering into an area, leaving from an area, being inside an area, periodic reporting or motion event reporting.

19. The first network entity of claim 14, further comprising:
means for transmitting the location report to the second network entity.

20. The first network entity of claim 14, wherein the first response comprises an indication of an expected time interval or a maximum time interval until the target user equipment next becomes reachable.

21. The first network entity of claim 14, wherein the first response comprises a last known location for the target user equipment.

22. A non-transitory computer-readable storage medium including program code stored thereon, the program code is operable to configure at least one processor in a first network entity for performing periodic and triggered location for a target user equipment, the program code comprising instructions to:
receive from a second network entity a periodic and triggered location request for the target user equipment;
transmit a first response to the second network entity indicating that the periodic and triggered location request has been received and accepted;
wait for the target user equipment to be in a reachable state with a wireless network if the target user equipment is not currently in a reachable state;
establish a signaling connection with the target user equipment;
transmit the periodic and triggered location request to the target user equipment, wherein the periodic and triggered location request comprises a type of a location reporting event, a maximum reporting interval, and a maximum event sampling interval in which the target user equipment is required to monitor whether the location reporting event has or has not occurred;
receive from the target user equipment a confirmation indicating that the periodic and triggered location request has been accepted;
transmit a second response to the second network entity indicating that the periodic and triggered location request has been activated in the target user equipment; and
receive a location report from the target user equipment when the location reporting event occurs and when no location reporting event occurs during the maximum reporting interval.

23. The non-transitory computer-readable storage medium of claim 22, wherein the signaling connection is established using a Narrowband Internet of Things (NB-IoT) radio access type (RAT), a Long Term Evolution (LTE) RAT, or a New Radio (NR) RAT.

24. The non-transitory computer-readable storage medium of claim 22, wherein the first network entity is a Mobility Management Entity (MME), an Access and Mobility Management Function (AMF), or a Location Management Function (LMF).

25. The non-transitory computer-readable storage medium of claim 24, wherein the second network entity is a Gateway Mobile Location Center (GMLC).

26. The non-transitory computer-readable storage medium of claim 22, wherein the type of location reporting event comprises at least one of entering into an area, leaving from an area, being inside an area, periodic reporting or motion event reporting.

27. The non-transitory computer-readable storage medium of claim 22, wherein the program code further comprises instruction to:
transmit the location report to the second network entity.

28. The non-transitory computer-readable storage medium of claim 22, wherein the first response comprises an indication of an expected time interval or a maximum time interval until the target user equipment next becomes reachable.

29. The non-transitory computer-readable storage medium of claim 22, wherein the first response comprises a last known location for the target user equipment.

* * * * *